US012474649B2

(12) United States Patent
Tsuda et al.

(10) Patent No.: US 12,474,649 B2
(45) **Date of Patent: *Nov. 18, 2025**

(54) TONER AND METHOD FOR PRODUCING TONER

(71) Applicant: CANON KABUSHIKI KAISHA, Tokyo (JP)

(72) Inventors: Shohei Tsuda, Shizuoka (JP); Taiji Katsura, Shizuoka (JP); Shintaro Kawaguchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 670 days.

This patent is subject to a terminal disclaimer.

(21) Appl. No.: 17/814,094

(22) Filed: Jul. 21, 2022

(65) Prior Publication Data

US 2023/0047510 A1 Feb. 16, 2023

(30) Foreign Application Priority Data

Jul. 28, 2021 (JP) ................................ 2021-123737

(51) Int. Cl.
*G03G 9/097* (2006.01)
*G03G 9/08* (2006.01)

(52) U.S. Cl.
CPC ....... *G03G 9/09716* (2013.01); *G03G 9/0804* (2013.01); *G03G 9/0819* (2013.01); *G03G 9/09708* (2013.01); *G03G 9/09725* (2013.01)

(58) Field of Classification Search
CPC ............ G03G 9/09716; G03G 9/0804; G03G 9/0819; G03G 9/09708; G03G 9/09725; G03G 9/08; G03G 9/093
See application file for complete search history.

(56) References Cited

U.S. PATENT DOCUMENTS

| | | | |
|---|---|---|---|
| 7,537,877 | B2 | 5/2009 | Yoshiba |
| 7,544,455 | B2 | 6/2009 | Yoshiba |
| 7,700,254 | B2 | 4/2010 | Moribe |
| 7,740,998 | B2 | 6/2010 | Yamazaki |
| 7,796,926 | B2 | 9/2010 | Matsuda |
| 7,855,042 | B2 | 12/2010 | Kobori |
| 7,858,282 | B2 | 12/2010 | Ayaki |
| 8,057,977 | B2 | 11/2011 | Moribe |
| 8,372,573 | B2 | 2/2013 | Ayaki |
| 8,383,313 | B2 | 2/2013 | Ayaki |
| 8,551,680 | B2 | 10/2013 | Ayaki |
| 9,097,998 | B2 | 8/2015 | Yamazaki |
| 9,128,400 | B2 | 9/2015 | Takahashi |
| 9,201,323 | B2 | 12/2015 | Nishikawa |
| 9,250,548 | B2 | 2/2016 | Nomura |
| 9,261,804 | B2 | 2/2016 | Yamazaki |
| 9,341,970 | B2 | 5/2016 | Yoshiba |
| 9,423,708 | B2 | 8/2016 | Tominaga |
| 9,606,462 | B2 | 3/2017 | Nomura |
| 9,632,441 | B2 | 4/2017 | Abe |
| 9,720,340 | B2 | 8/2017 | Tominaga |
| 9,733,583 | B2 | 8/2017 | Kuroki |
| 9,733,584 | B2 | 8/2017 | Masumoto |
| 9,785,077 | B2 | 10/2017 | Abe |
| 9,829,818 | B2 | 11/2017 | Yoshiba |
| 9,829,820 | B2 | 11/2017 | Masumoto |
| 9,897,932 | B2 | 2/2018 | Hotta |
| 9,921,501 | B2 | 3/2018 | Mochizuki |
| 9,971,263 | B2 | 5/2018 | Fukudome |
| 10,101,683 | B2 | 10/2018 | Nishikawa |
| 10,114,303 | B2 | 10/2018 | Katsura |
| 10,241,430 | B2 | 3/2019 | Kimura |
| 10,289,016 | B2 | 5/2019 | Fukudome |
| 10,295,921 | B2 | 5/2019 | Ohmori |
| 10,303,074 | B2 | 5/2019 | Yamawaki |
| 10,429,757 | B2 | 10/2019 | Yoshida |
| 10,503,090 | B2 | 12/2019 | Tominaga |
| 10,545,422 | B2 | 1/2020 | Yamawaki |
| 10,578,990 | B2 | 3/2020 | Tsuda |
| 10,635,011 | B2 | 4/2020 | Umeda |
| 10,678,155 | B2 | 6/2020 | Terui |
| 10,732,529 | B2 | 8/2020 | Yoshiba |
| 10,747,133 | B2 | 8/2020 | Yagi |
| 10,747,134 | B2 | 8/2020 | Watanabe |
| 10,768,540 | B2 | 9/2020 | Watanabe |
| 10,782,623 | B2 | 9/2020 | Yoshiba |

(Continued)

FOREIGN PATENT DOCUMENTS

| | | | |
|---|---|---|---|
| EP | 3 674 806 | A1 | 7/2020 |
| JP | 8-248670 | A | 9/1996 |

(Continued)

OTHER PUBLICATIONS

U.S. Appl. No. 17/655,414, filed Mar. 18, 2022, Hidekazu Fumita.

(Continued)

*Primary Examiner* — Peter L Vajda
*Assistant Examiner* — Grant Steven Seiler
(74) *Attorney, Agent, or Firm* — VENABLE LLP

(57) ABSTRACT

A toner comprising: a toner particle comprising a binder resin and boric acid; and an external additive A having a primary particle major diameter of 80 to 200 nm, wherein in ATR-IR analysis of the toner particle in an ATR method using germanium as an ATR crystal, a peak corresponding to boric acid is detected, the average value of a shape factor SF-1 of the external additive A is 105 to 250, and the average value of a shape factor SF-2 of the external additive A is 102 to 250.

9 Claims, 1 Drawing Sheet

(56) References Cited

U.S. PATENT DOCUMENTS

| | | | | |
|---|---|---|---|---|
| 10,809,639 | B2 | 10/2020 | Yamawaki | |
| 10,845,721 | B2 | 11/2020 | Tanaka | |
| 10,942,463 | B2 | 3/2021 | Yoshiba | |
| 10,942,465 | B2 | 3/2021 | Kototani | |
| 10,942,466 | B2 | 3/2021 | Tominaga | |
| 10,969,704 | B2 | 4/2021 | Kagawa | |
| 10,976,679 | B2 | 4/2021 | Tanaka | |
| 11,003,104 | B2 | 5/2021 | Katsura | |
| 11,003,105 | B2 | 5/2021 | Sato | |
| 11,099,493 | B2 | 8/2021 | Komiya | |
| 11,112,709 | B2 | 9/2021 | Saeki | |
| 11,112,713 | B2 | 9/2021 | Akiyama | |
| 11,169,460 | B2 | 11/2021 | Kototani | |
| 11,181,844 | B2 | 11/2021 | Nagaoka | |
| 11,249,408 | B2 | 2/2022 | Tsuda | |
| 11,262,666 | B2 | 3/2022 | Yoshiba | |
| 2005/0255399 | A1 | 11/2005 | Ichikawa | |
| 2008/0227003 | A1 | 9/2008 | Honda et al. | |
| 2009/0196658 | A1 | 8/2009 | Sugiura | |
| 2012/0052430 | A1 | 3/2012 | Yamasaki | |
| 2013/0171551 | A1 | 7/2013 | Sun | |
| 2013/0252167 | A1 | 9/2013 | Moribe | |
| 2014/0004460 | A1 | 1/2014 | Yoshiba | |
| 2014/0295341 | A1* | 10/2014 | Fomitchev et al. | G03G 9/08 |
| 2015/0220013 | A1 | 8/2015 | Nishikawa | |
| 2015/0248072 | A1 | 9/2015 | Katsuta | |
| 2016/0161874 | A1 | 6/2016 | Yamazaki | |
| 2017/0010547 | A1* | 1/2017 | Bejat et al. | G03G 9/08 |
| 2019/0243272 | A1 | 8/2019 | Sakurada et al. | |
| 2020/0064751 | A1 | 2/2020 | Murayama | |
| 2020/0073266 | A1 | 3/2020 | Ohtsu | |
| 2020/0285169 | A1* | 9/2020 | Kubo et al. | G03G 15/01 |
| 2021/0223731 | A1 | 7/2021 | Suzuki | |
| 2021/0255557 | A1 | 8/2021 | Watanabe et al. | |
| 2021/0373450 | A1 | 12/2021 | Kawaguchi | |
| 2021/0397110 | A1 | 12/2021 | Katsura | |
| 2022/0121132 | A1 | 4/2022 | Yoshida | |
| 2022/0121133 | A1 | 4/2022 | Yamawaki | |
| 2022/0128916 | A1 | 4/2022 | Yoshida | |
| 2022/0171302 | A1 | 6/2022 | Sato | |
| 2022/0291601 | A1 | 9/2022 | Katsura | |
| 2023/0004099 | A1 | 1/2023 | Seino | |
| 2023/0042289 | A1 | 2/2023 | Tanaka | |
| 2023/0051836 | A1 | 2/2023 | Tominaga | |
| 2023/0065610 | A1 | 3/2023 | Yoshiba | |

FOREIGN PATENT DOCUMENTS

| | | | |
|---|---|---|---|
| JP | 2001-228650 | A | 8/2001 |
| JP | 2004-287185 | A | 10/2004 |
| JP | 2007-25525 | A | 2/2007 |
| JP | 2007-241310 | A | 9/2007 |
| JP | 2008-158176 | A | 7/2008 |
| JP | 2009-186512 | A | 8/2009 |
| JP | 2009-300848 | A | 12/2009 |
| JP | 2011-59261 | A | 3/2011 |
| JP | 2012-47914 | A | 3/2012 |
| JP | 2013-20113 | A | 1/2013 |
| JP | 2015-506494 | A | 3/2015 |
| JP | 6059251 | A | 1/2017 |
| JP | 2019-159001 | A | 9/2019 |
| JP | 2020-34901 | A | 3/2020 |
| JP | 2020-106816 | A | 7/2020 |
| WO | 2013/063291 | A1 | 5/2013 |

OTHER PUBLICATIONS

U.S. Appl. No. 17/814,089, filed Jul. 21, 2022, Masatake Tanaka.
U.S. Appl. No. 17/814,143, filed Jul. 21, 2022, Tatsuya Saeki.
U.S. Appl. No. 17/935,721, filed Sep. 27, 2022, Takashi Kenmoku.
U.S. Appl. No. 17/936,104, filed Sep. 28, 2022, Tatsuya Saeki.
U.S. Appl. No. 17/936,943, filed Sep. 30, 2022, Kozue Uratani.

* cited by examiner

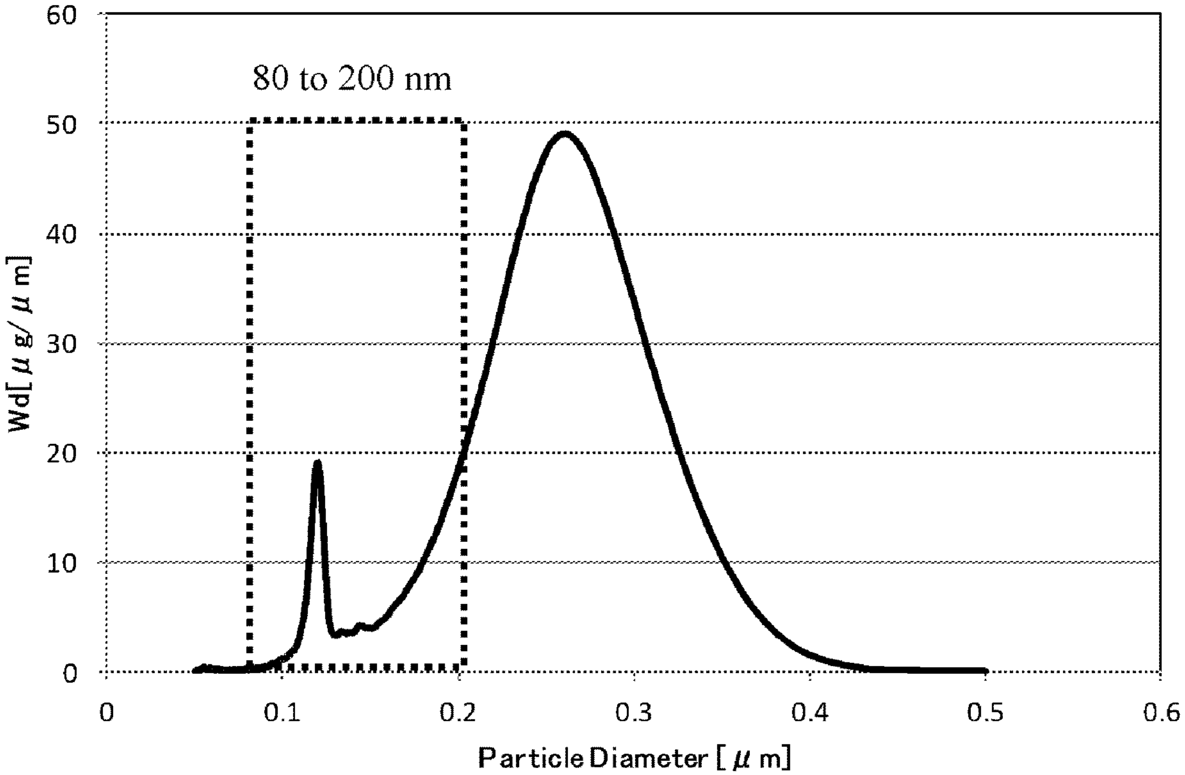
60
50
40
30
20
10
0
Wd[μg/μm]
80 to 200 nm
0
0.1
0.2
0.3
0.4
0.5
0.6
Particle Diameter [μm]

TONER AND METHOD FOR PRODUCING TONER

BACKGROUND OF THE INVENTION

Field of the Invention

The present disclosure relates to: a toner able to be used in electrophotography methods, electrostatic recording methods, toner jet recording methods, and the like (hereinafter referred to simply as a "toner" in some cases); and a method for producing the toner.

Description of the Related Art

In recent years, demands have increased for significantly higher processing speeds and longer service lives for electrophotographic image forming apparatuses. In order to achieve significantly higher speeds and longer service lives while maintaining electrophotographic image quality, we recognize that technical developments are needed in order to improve the durability of toners per se.

That is to say, as printers achieve significantly faster processing speeds and longer service lives, stresses applied to toners increase and external additives present at toner particle surfaces are more likely to become embedded or detached. As a result, toner fluidity decreases and image density decreases. In addition, an external additive that has become detached from a toner migrates to an electrostatic latent image bearing member, contaminates a charging member by not being scraped off by a cleaning blade, and is subjected to a shearing force by the cleaning blade or a nip part of the charging member, thereby causing scratches on the electrostatic latent image bearing member. As a result, a decrease in image density can occur due to white spots and faulty charging in a cycle of a charging member, and image defects such as streaks and white spots can occur in a cycle of an electrostatic latent image bearing member.

In order to prevent charging member contamination by an external additive and scratches on an electrostatic latent image bearing member, it is essential to prevent the external additive from being embedded in the toner or becoming detached from the toner. We considered that one way of achieving this is to prevent an external additive from being embedded in a toner or becoming detached from a toner by adding a heteromorphic large particle diameter external additive having an appropriate shape that is not spherical.

Japanese Patent Application Publication Nos. 2009-186512 and 2011-059261 indicate that by fixing silica having a specific shape to a toner, the fluidity of the toner is maintained and filming (contamination) resistance and so on of an electrostatic latent image bearing member can be improved.

SUMMARY OF THE INVENTION

Investigations by the inventors of the present invention confirmed that the toners set forth in Japanese Patent Application Publication Nos. 2009-186512 and 2011-059261 definitely achieved a certain level of effect in terms of maintaining toner fluidity and preventing contamination of key parts. However, it was recognized that there is still room for improvement in terms of significantly increasing processing speeds and extending service lives. Specifically, it was understood that scratches occurred on electrostatic latent image bearing members in some cases when processing speeds were increased and service lives were extended.

The present disclosure provides: a toner which can prevent contamination of a charging member and suppress scratches on an electrostatic latent image bearing member and which can stably form a high quality electric photographic image even if the processing speed is significantly increased and the service life is extended; and a method for producing the toner.

The present disclosure relates to a toner comprising:

a toner particle comprising a binder resin and boric acid; and an external additive A having a primary particle major diameter of 80 to 200 nm, wherein in ATR-IR analysis of the toner particle in an ATR method using germanium as an ATR crystal, a peak corresponding to boric acid is detected, the average value of a shape factor SF-1 of the external additive A is 105 to 250, and the average value of a shape factor SF-2 of the external additive A is 102 to 250.

Also, the present disclosure relates to a toner production method for producing the above toner, the toner production method comprising (1) a dispersion step for preparing a dispersed solution of binder resin fine particles containing the binder resin, (2) an aggregation step for aggregating the binder resin fine particles contained in the dispersed solution of the binder resin fine particles so as to form aggregates, and (3) a fusion step for heating and fusing the aggregates, wherein a boric acid source is added to the dispersed solution in at least one of the step (2) and step (3).

The present disclosure can provide: a toner which can prevent contamination of a charging member and suppress scratches on an electrostatic latent image bearing member and which can stably form a high quality electric photographic image even if the processing speed is significantly increased and the service life is extended; and a method for producing the toner.

Further features of the present invention will become apparent from the following description of exemplary embodiments with reference to the attached drawings.

BRIEF DESCRIPTION OF THE DRAWINGS

The FIGURE is an example of particle size distribution measurement data.

DESCRIPTION OF THE EMBODIMENTS

In the present disclosure, the terms "from XX to YY" and "XX to YY", which indicate numerical ranges, mean numerical ranges that include the lower limits and upper limits that are the end points of the ranges. In cases where numerical ranges are indicated incrementally, upper limits and lower limits of the numerical ranges can be arbitrarily combined.

The present disclosure relates to a toner comprising:

a toner particle comprising a binder resin and boric acid; and an external additive A having a primary particle major diameter of 80 to 200 nm, wherein in ATR-IR analysis of the toner particle in an ATR method using germanium as an ATR crystal, a peak corresponding to boric acid is detected, the average value of a shape factor SF-1 of the external additive A is 105 to 250, and the average value of a shape factor SF-2 of the external additive A is 102 to 250.

According to this type of toner, it is possible to prevent contamination of a charging member and suppress scratches on an electrostatic latent image bearing member and it is possible to stably form a high quality electric photographic image even if the processing speed is significantly increased and the service life is extended. The reason for this will now be explained.

The inventors of the present invention have surmised that the reason why the toner according to Japanese Patent Application Publication No. 2009-186512 cannot sufficiently suppress scratches on an electrostatic latent image bearing member when the processing speed is significantly increased and the service life is extended is as follows. Because the toner according to Japanese Patent Application Publication No. 2009-186512 has a large particle diameter external additive having a specific shape that is not spherical at a toner particle surface, the number of contact points between toner particles and the external additive increases, and it is possible to prevent the external additive from becoming embedded in the toner particle and prevent the external additive from migrating to an electrostatic latent image bearing member and other key parts.

However, if the processing speed increases or the service life is extended, migration of the external additive is facilitated to a significant extent. In addition, a shearing force applied between a cleaning blade and an electrostatic latent image bearing member increases as processing speed increases. In addition, because an aspherical external additive having many contact points is used in order to prevent the external additive becoming detached from the toner, the force of attachment of the external additive to the electrostatic latent image bearing member increases.

As a result, it is thought that the external additive is unlikely to be scraped off by a cleaning blade, a large number of fine scratches occur on the electrostatic latent image bearing member because the external additive is held between nip parts, and white spots and streaks occur on an image in a cycle of an electrostatic latent image bearing member. Therefore, it was difficult in the past to prevent both contamination of a charging member and scratches on an electrostatic latent image bearing member.

We investigated the force of attachment between an external additive and an electrostatic latent image bearing member when the external additive became detached from a toner particle surface. Forces of attachment generally include electrostatic forces of attachment in addition to non-electrostatic forces of attachment. When the external additive became detached from the charged toner, it was thought that electrostatic forces of attachment may have increased as a result of microscopic separation discharge occurring and the external additive per se becoming excessively charged. That is, it was thought that if it is possible to prevent overcharging caused by this microscopic separation discharge, the force of attachment between the external additive and the electrostatic latent image bearing member can be reduced, the external additive can be more easily scraped off by the cleaning blade, and scratches on the electrostatic latent image bearing member can be suppressed. In view of the considerations above, we carried out further investigations and found that the toner according to the present disclosure can meet the above-mentioned requirements well.

The toner contains a toner particle and external additives. In addition, the toner comprises an external additive A having a primary particle major diameter of 80 to 200 nm, and the toner is characterized in that the average value of the shape factor SF-1 of external additive A is from 105 to 250 and the average value of the shape factor SF-2 of external additive A is from 102 to 250.

First, of the external additives present at the toner particle surface, if the average values of the shape factors SF-1 and SF-2 of the external additive A fall within the ranges mentioned above, it is possible to increase the number of contact points between the external additive A and the toner particle surface. Therefore, detachment of the external additive A from the toner particle is greatly suppressed and contamination of a charging member can be prevented.

However, the external additive A, which migrates to the electrostatic latent image bearing member to a significant extent, has a strong force of attachment to the electrostatic latent image bearing member and is held by, for example, a nip part of a cleaning blade, and this causes scratches. As mentioned above, the reason for this is that the external additive A undergoes separation discharge when detaching from the toner particle, and electrostatic forces of attachment increase due to the external additive A per se becoming excessively charged. Furthermore, because the external additive A has a large number of contact points with the electrostatic latent image bearing member due to having a characteristic shape, non-electrostatic forces of attachment of the external additive A also increase.

However, by controlling IR analysis (crystal: Ge) using an ATR method so that boric acid is detected, it was understood that scratches on the electrostatic latent image bearing member from a toner particle to which the external additive A has been added are dramatically suppressed. It is surmised that the reason why scratches on the electrostatic latent image bearing member are dramatically suppressed if boric acid is detected is as follows.

In the ATR method, if an absorption spectrum is measured within the wavelength range 4000 $cm^{-1}$ to 650 $cm^{-1}$ at an incidence angle of 45° using germanium (Ge) in an ATR crystal, the presence of an absorption peak at 1380 $cm^{-1}$ means that boric acid is present at a depth of approximately 0.3 μm. That is, if a peak corresponding to boric acid is detected from a toner particle in ATR-IR analysis using germanium, this means that boric acid is present close to the toner particle surface.

Because boric acid is a substance that is highly soluble in water, a toner particle surface can take on moisture to a certain extent if boric acid is present near the toner particle surface. If moisture is present, separation discharge that occurs when the external additive becomes detached can be largely prevented, and the external additive per se migrates to the electrostatic latent image bearing member without becoming excessively charged. Therefore, even in the case of an aspherical external additive, which is used in order to suppress embedding and migration of the external additive, the force of attachment to the electrostatic latent image bearing member can be significantly suppressed and the occurrence of scratches on the electrostatic latent image bearing member can be prevented.

Therefore, it is thought that it is possible to prevent contamination of a charging member and suppress scratches on an electrostatic latent image bearing member and it is possible to stably form a high quality electric photographic image even if the processing speed is significantly increased and the service life is extended. This is an advantageous effect newly achieved by causing an external additive having an aspherical characteristic shape to be present with boric acid near the toner particle surface.

The means for incorporating the boric acid in the toner particle is not particularly limited. For example, the boric acid can be internally added to the toner particle or can be incorporated in the toner particle by being used as a flocculant in an aggregation method. By adding the boric acid as a flocculant, it is easier to introduce the boric acid near the toner particle surface. At a stage where the boric acid is used as a raw material, the boric acid may be used in a form such as an organic boric acid, a boric acid salt or a boric acid ester. In a case where the toner particle is produced in an aqueous medium, the boric acid is preferably added as a boric acid salt from the perspectives of reactivity and production stability, with specific examples thereof including sodium tetraborate and ammonium borate, and it is particularly preferable to use borax.

Because borax is sodium tetraborate ($Na_2B_4O_7$) decahydrate and is converted into boric acid in acidic aqueous solutions, it is preferable to use borax in a case where the boric acid is used in an acidic environment in an aqueous medium.

In addition, in fluorescence X-Ray measurements of the toner particle, the intensity of boron derived from the boric acid is preferably from 0.10 kcps to 0.60 kcps, and more preferably from 0.10 kcps to 0.30 kcps. By controlling the intensity within this range, it becomes easier to achieve a balance between toner charging performance and preventing separation discharge when the external additive becomes detached.

A means for controlling the intensity of boron within the range mentioned above is to, for example, regulate the added quantity of a boric acid source when the toner particle is produced, and it is preferable to regulate the content of the boric acid in the toner particle to from 0.1 mass % to 10.0 mass %. The content of the boric acid in the toner particle is preferably from 0.4 mass % to 5.0 mass %, and more preferably from 0.8 mass % to 2.0 mass %.

In addition, of the external additives present at the toner particle surface, an external additive having a primary particle major diameter of from 80 nm to 200 nm is denoted as external additive A. Here, the average value of the shape factor SF-1 of the external additive A must be from 105 to 250, and the average value of the shape factor SF-2 of the external additive A must be from 102 to 250.

If the shape factors SF-1 and SF-2 of the external additive A are lower than the lower limits mentioned above, the shape of the silica becomes more spherical and the external additive A rolls and passes through the space between the cleaning blade and the electrostatic latent image bearing member. As a result, the charging member that is downstream of the cleaning blade becomes contaminated, and image density non-uniformity is seen in half tone images and the like.

Meanwhile, if SF-1 exceeds 250, the major diameter of the external additive tends to increase, fluidity decreases, and initial image density decreases. In addition, if SF-2 exceeds 250, the degree of unevenness further increases, coalesced particles tend to break as a result of long-term use, the particle size decreases, and a spacer effect, such as embedding in the toner particle surface, is insufficient, meaning that image density decreases as a result of long-term use.

The average value of SF-1 is preferably from 105 to 150, more preferably from 110 to 140, and further preferably from 115 to 130. The average value of SF-2 is preferably from 102 to 140, more preferably from 105 to 130, and further preferably from 108 to 120.

The external additive A is preferably fine particles containing silica fine particles. SF-1 and SF-2 can be controlled by controlling the method for producing these silica fine particles.

Examples of methods for producing the silica fine particles include the following methods.

A gas phase method comprising combusting silicon tetrachloride at a high temperature together with a mixed gas of oxygen, hydrogen and a diluting gas (for example, nitrogen, argon, carbon dioxide, or the like) (dry silica or fumed silica).

A gas phase oxidation method comprising directly oxidizing a metallic silicon powder in a chemical flame comprising oxygen and hydrogen to obtain a silica fine powder.

A wet method comprising hydrolyzing an alkoxysilane using a catalyst in an organic solvent in which water is present, carrying out a condensation reaction, and then removing the solvent from the obtained silica sol suspension (sol-gel silica).

In addition, it is possible to use a method comprising classifying and/or crushing silica fine particles obtained using a production method such as those mentioned above so as to obtain silica fine particles having a desired volume average particle diameter. In a case where silica fine particles are used as the external additive A, dry silica fine particles produced using a gas phase method or the like are more preferred from the perspective of being able to control the shape factors within the ranges mentioned above.

For example, a silicon halide compound is used as a raw material for gas phase silica. Silicon tetrachloride can be used as the silicon halide compound, but it is possible to use a silane compound, such as methyltrichlorosilane or trichlorosilane, in isolation or a mixture of silicon tetrachloride and a silane compound as a raw material.

The target silica is obtained by vaporizing the raw material and carrying out a so-called flame hydrolysis reaction comprising reacting the vaporized raw material with water, which is produced as an intermediate in an oxyhydrogen flame. For example, a pyrolysis reaction of silicon tetrachloride gas in oxygen and hydrogen is used, and the reaction formula is as follows.

$$SiCl_4+2H_2+O_2 \rightarrow SiO_2+4HCl$$

A silica powder was produced by supplying oxygen gas to a burner, lighting an ignition burner, supplying hydrogen gas to the burner to form a flame, and introducing silicon tetrachloride as a raw material to the flame to gasify the silicon tetrachloride and carry out a flame hydrolysis reaction.

The average particle diameter and shape can be controlled by altering the speed at which the raw material gas is supplied, the supply rate and/or oxygen ratio of a combustible gas, the residence time of silica in the flame, and so on. In addition, the external additive A preferably includes an organic-inorganic complex fine particle in which inorganic fine particles and resin particles are complexed. The inorganic fine particles are not particularly limited, but examples thereof include silica fine particles. The organic-inorganic complex fine particles will now be explained in detail.

The organic-inorganic complex fine particles are preferably particles having a structure in which a resin particle is used as a core particle and inorganic fine particles such as silica fine particles are present at the surface of the core particle. In addition, it is more preferable for at least some of the inorganic fine particles to be embedded in the resin particle.

An advantage of complexing is being more able to control SF-1 and SF-2 within the ranges mentioned above. Methods for controlling shape include controlling the blending ratio of the resin particles and the silica fine particles, controlling the particle diameter of the silica fine particles, and whether to use hydrophilic or hydrophobic silica fine particles. More specifically, it is possible to, for example, increase the particle diameter of the inorganic fine particles in order to increase SF-1 and SF-2. For example, it is possible to increase the content of the inorganic fine particles in order to lower SF-1 and SF-2.

Examples of resin particles include polymers of (meth) acrylic group-containing alkoxysilane compounds such as 3-methacryloxypropyltrimethoxysilane, 3-methacryloxypropylmethyldimethoxysilane and 3-methacryloxypropyltriethoxysilane.

Methods for complexing resin particles with silica fine particles include a method disclosed in WO 2013/063291. For example, a method comprising mixing an alkoxysilane compound mentioned above with a dispersed solution of silica fine particles and polymerizing the alkoxysilane compound in the presence of the silica fine particles.

Silica fine particles such as a spherical dry silica or organic-inorganic complex fine particles obtained using silica fine particles can be advantageously used as the external additive A. It is more preferable for the external additive A to be organic-inorganic complex fine particles. This is for the following two reasons.

The first reason is that because the particle size distribution is easy to control, the external additive A tends to be uniformly attached to the toner particle surface and unbalanced migration in the longitudinal direction of the electrostatic latent image bearing member tends to be suppressed. The second reason is that organic-inorganic complex fine particles tend to have a more suitable saturated moisture adsorption amount than dry silica and better prevent separation discharge when the external additive becomes detached from the toner particle surface.

Moreover, the saturated moisture adsorption amount of the external additive A is preferably from 0.10 mass % to 4.50 mass %, more preferably from 1.00 mass % to 4.00 mass %, and further preferably from 1.80 mass % to 3.90 mass %. In order to control the saturated moisture adsorption amount within this range, the saturated moisture adsorption amount can be controlled by controlling the silica production method, the type of hydrophobic treatment agent and the amount of treatment in the case of silica fine particles for example. In addition, in the case of organic-inorganic complex fine particles, the saturated moisture adsorption amount can be controlled by controlling the particle diameter and amount of inorganic fine particles coated on the surface of the resin particles. A method for measuring saturated moisture adsorption amount is described later.

The content of the inorganic fine particles in the inorganic-organic complex particles is preferably from 40 mass % to 80 mass %, more preferably from 50 mass % to 75 mass %, and further preferably from 55 mass % to 70 mass %. The number average particle diameter of primary particles of the inorganic fine particles in the inorganic-organic complex particles is preferably 5 to 60 nm, and more preferably 10 to 30 nm.

The external additive A may be subjected to a surface treatment such as a hydrophobic treatment or a silicone oil treatment.

A hydrophobic treatment is carried out by chemically treating with an organosilicon compound that reacts with, or physically adsorbs to, silica. A preferred method is to treat silica, which has been produced by vapor phase oxidation of a silicon halide compound, with an organosilicon compound.

Examples of such organosilicon compounds include the following. Hexamethyldisilazane, trimethylsilane, trimethylchlorosilane, trimethylethoxysilane, dimethyldichlorosilane, methyltrichlorosilane, allyldimethylchlorosilane, allylphenyldichlorosilane and benzyldimethylchlorosilane.

Further examples include bromomethyldimethylchlorosilane, α-chloroethyltrichlorosilane, β-chloroethyltrichlorosilane, chloromethyldimethylchlorosilane, triorganosilylmercaptans, trimethylsilylmercaptan and triorganosilyl acrylates.

Further examples include vinyldimethylacetoxysilane, dimethylethoxysilane, dimethyldimethoxysilane, diphenyldiethoxysilane and 1-hexamethyldisiloxane.

Further examples include 1,3-divinyltetramethyldisiloxane, 1,3-diphenyltetramethyldisiloxane and dimethylpolysiloxanes which have 2 to 12 siloxane units per molecule and have one hydroxyl group on each Si positioned at a terminal. It is possible to use one of these organosilicon compounds, or a mixture of two or more types thereof.

In addition, a preferred silicone oil for the silicone oil-treated silica is one having a viscosity at 25° C. of from 30 $mm^2/s$ to 1000 $mm^2/s$.

For example, dimethyl silicone oils, methylphenylsilicone oils, α-ethyl styrene-modified silicone oils, chlorophenyl silicone oils and fluorine-modified silicone oils.

Examples of silicone oil treatment methods include the following.

A method comprising directly mixing silane coupling agent-treated silica with a silicone oil using a mixer such as a Henschel mixer.

A method of spraying a silicone oil onto silica serving as a base. A method of dissolving or dispersing a silicone oil in an appropriate solvent, adding silica, mixing and then removing the solvent.

In the case of silicone oil-treated silica, it is more preferable to heat silica at a temperature of 200° C. or higher (and more preferably 250° C. or higher) in an inert gas atmosphere after being treated with a silicone oil in order to stabilize a surface coating.

An example of a preferred silane coupling agent is hexamethyldisilazane (HMDS).

In addition, the content of the external additive A in the toner is preferably from 0.1 parts by mass to 3.0 parts by mass, more preferably from 0.4 parts by mass to 2.5 parts by mass, further preferably from 0.5 parts by mass to 2.0 parts by mass, and further preferably from 0.6 parts by mass to 1.6 parts by mass, relative to 100.0 parts by mass of the toner particle in the toner.

In addition, it is preferable for the toner to contain both the external additive A and the external additive B, which is different from the external additive A. The external additive B is more preferably silica fine particles. The number average particle diameter of primary particles of the external additive B is preferably from 5 nm to 30 nm, and more preferably from 10 nm to 20 nm.

By incorporating the external additive B, which is silica fine particles having particle diameters of from 5 nm to 30 nm, the external additive A tends to be uniformly dispersed at the toner particle surface and the occurrence of scratches on the electrostatic latent image bearing member tends to be better suppressed. This is thought to be because the condition of the toner particle surface is homogenized as a result of the external additive B, which has a particle size within the range mentioned above, becoming embedded in ultrafine recesses at the toner particle surface. As a result, the dispersibility of the external additive A is improved, unbalanced migration in the longitudinal direction of the electrostatic latent image bearing member tends to be suppressed, and the occurrence of scratches tends to be better suppressed.

For example, commercially available silica such as AEROSIL 130, 200, 300, 380, TT600, MOX170, MOX80 and COK84 (produced by Nippon Aerosil Co. Ltd.), Ca-O-SiL M-5, MS-7, MS-75, HS-5 and EH-5 (produced by (CABOT Co.) Wacker HDK N20, V15, N20E, T30 and T40 (produced by WACKER-CHEMIE GMBH), D-C Fine Silica (produced by Dow Corning Toray Silicone Co., Ltd.) and Fransol (produced by Fransil) can be used as external additive B.

In addition, the content of the external additive B is preferably from 0.1 parts by mass to 3.0 parts by mass, and more preferably from 0.3 parts by mass to 1.5 parts by mass, relative to 100 parts by mass of the toner particle.

In addition, the dispersion evaluation index of the external additive B is preferably 0.4 or less, and more preferably 0.3 or less. The lower limit for the dispersion evaluation index is not particularly limited, but is preferably 0.1 or more. A smaller dispersion evaluation index indicates better dispersibility. If the dispersion evaluation index falls within this range, the external additive B tends to become embedded in ultrafine recesses at the toner particle surface and the dispersibility of the external additive A tends to be improved. The dispersion evaluation index of the external additive B can be controlled by adjusting the amount of silica fine particles and external addition conditions such as time of external addition and speed of rotation of an external addition device.

Furthermore, if the content of the external additive A in the toner is taken to be 100 parts by mass, the content of the external additive B in the toner is preferably from 20 parts by mass to 300 parts by mass, more preferably from 50 parts by mass to 150 parts by mass, and further preferably from 50 parts by mass to 90 parts by mass. If the relationship above is satisfied, fluidity retention tends to be facilitated and a decrease in image density tends to be further suppressed.

In addition to the external additive A and the external additive B, other external additives may be added to the toner if necessary.

For example, auxiliary electrification agents, electrical conductivity-imparting agents, flowability-imparting agents, anti-caking agents, mold-release agents at the time of hot roller fixing, lubricants and resin fine particles and inorganic fine particles that act as abrasive materials. Examples of lubricants include polyfluoroethylene powders, zinc stearate powders and poly(vinylidene fluoride) powders. Of these, a poly(vinylidene fluoride) powder is preferred. Examples of abrasive materials include cerium oxide powders, silicon carbide powders and strontium titanate powders.

Methods for producing components that constitute the toner and a method for producing the toner will now be explained in greater detail.

Binder Resin

The toner particle contains a binder resin. The content of the binder resin is preferably 50 mass % or more of the entire amount of resin components in the toner particle.

The binder resin is not particularly limited, but examples thereof include styrene acrylic resins, epoxy resins, polyester resins, polyurethane resins, polyamide resins, cellulose resins, polyether resins, and mixed resins and complex resins of these. From the perspectives of cost, ease of procurement and excellent low-temperature fixability, a styrene acrylic resin or a polyester resin is preferred. A polyester resin is more preferred.

The polyester resin can be obtained by using a well-known method, such as a transesterification method or a polycondensation method, by selecting and combining appropriate materials from among polycarboxylic acids, polyols, hydroxycarboxylic acids, and the like. The polyester resin preferably contains a condensation polymer of a dicarboxylic acid and a diol.

A polycarboxylic acid is a compound having two or more carboxyl groups per molecule. Of these, a dicarboxylic acid is a compound having two carboxyl groups per molecule, and is preferably used.

Examples thereof include oxalic acid, succinic acid, glutaric acid, maleic acid, adipic acid, β-methyladipic acid, azelaic acid, sebacic acid, nonanedicarboxylic acid, decanedicarboxylic acid, undecanedicarboxylic acid, dodecanedicarboxylic acid, fumaric acid, citraconic acid, diglycolic acid, cyclohexane-3,5-diene-1,2-carboxylic acid, hexahydroterephthalic acid, malonic acid, pimelic acid, suberic acid, phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediacetic acid, o-phenylenediacetic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracenedicarboxylic acid and cyclohexanedicarboxylic acid.

In addition, examples of polycarboxylic acids other than the dicarboxylic acids mentioned above include trimellitic acid, trimesic acid, pyromellitic acid, naphthalenetricarboxylic acid, naphthalenetetracarboxylic acid, pyrenetricarboxylic acid, pyrenetetracarboxylic acid, itaconic acid, glutaconic acid, n-dodecylsuccinic acid, n-dodecenylsuccinic acid, isododecylsuccinic acid, isododecenylsuccinic acid, n-octylsuccinic acid and n-octenylsuccinic acid. It is possible to use one of these polycarboxylic acids in isolation or a combination of two or more types thereof.

A polyol is a compound having two or more hydroxyl groups per molecule. Of these, a diol is a compound having two hydroxyl groups per molecule, and is preferably used.

Specific examples include ethylene glycol, diethylene glycol, triethylene glycol, 1,2-propane diol, 1,3-propane diol, 1,4-butane diol, 1,5-pentane diol, 1,6-hexane diol, 1,7-heptane diol, 1,8-octane diol, 1,9-nonane diol, 1,10-decane diol, 1,11-undecane diol, 1,12-dodecane diol, 1,13-tridecane diol, 1,14-tetradecane diol, 1,18-octadecane diol, 1,14-eicosane diol, dipropylene glycol, polyethylene glycol, polypropylene glycol, polytetramethylene ether glycol, 1,4-cyclohexane diol, 1,4-cyclohexane dimethanol, 1,4-butene diol, neopentyl glycol, polytetramethylene glycol, hydrogenated bisphenol A, bisphenol A, bisphenol F, bisphenol S, and alkylene oxide (ethylene oxide, propylene oxide, butylene oxide and the like) adducts of these bisphenol compounds.

Of these, alkylene glycols having 2 to 12 carbon atoms and alkylene oxide adducts of bisphenol compounds are preferred, and alkylene oxide adducts of bisphenol compounds and combinations of alkylene oxide adducts of bisphenol compounds and alkylene glycols having 2 to 12 carbon atoms are particularly preferred. A compound represented by formula (A) below can be given as an example of an alkylene oxide adduct of bisphenol A.

(A)

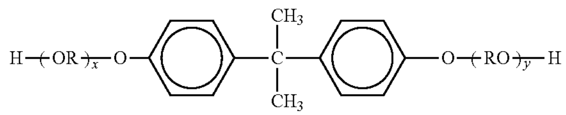

(In formula (A), R moieties are each independently an ethylene group or a propylene group, x and y are each an integer of 0 or more, and the average value of x+y is from 0 to 10.)

The alkylene oxide adduct of bisphenol A is preferably a propylene oxide adduct and/or ethylene oxide adduct of bisphenol A. A propylene oxide adduct is more preferred. In addition, the average value of x+y is preferably from 1 to 5.

Examples of trihydric or higher alcohols include glycerin, trimethylolethane, trimethylolpropane, pentaerythritol, hexamethylolmelamine, hexaethylolmelamine, tetramethylolbenzoguanamine, tetraethylolbenzoguanamine, sorbitol, trisphenol PA, phenol novolac, cresol novolac and alkylene oxide adducts of the trihydric or higher polyphenol compounds listed above. It is possible to use one of these trihydric or higher alcohols in isolation or a combination of two or more types thereof.

Examples of styrene acrylic resins include homopolymers comprising polymerizable monomers listed below, copolymers obtained by combining two or more of these polymerizable monomers, and mixtures of these.

Styrene-based monomers such as styrene, α-methylstyrene, β-methylstyrene, o-methylstyrene, m-methyl styrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene and p-phenylstyrene;

(meth)acrylic monomers such as methyl (meth)acrylate, ethyl (meth)acrylate, n-propyl (meth)acrylate, iso-propyl (meth)acrylate, n-butyl (meth)acrylate, iso-butyl (meth) acrylate, tert-butyl (meth)acrylate, n-amyl (meth)acrylate, n-hexyl (meth)acrylate, 2-ethylhexyl (meth)acrylate, n-octyl (meth)acrylate, n-nonyl (meth)acrylate, cyclohexyl (meth) acrylate, benzyl (meth)acrylate, dimethyl phosphate ethyl (meth)acrylate, diethyl phosphate ethyl (meth)acrylate, dibutyl phosphate ethyl (meth)acrylate, 2-benzoyloxyethyl (meth)acrylate, (meth)acrylonitrile, 2-hydroxyethyl (meth) acrylate, (meth)acrylic acid and maleic acid;

Vinyl ether-based monomers such as vinyl methyl ether and vinyl isobutyl ether; and vinyl ketone-based monomers such as vinyl methyl ketone, vinyl ethyl ketone and vinyl isopropenyl ketone;

Polyolefins of ethylene, propylene, butadiene, and the like.

The styrene acrylic resin can be obtained using a polyfunctional polymerizable monomer if necessary. Examples of polyfunctional polymerizable monomers include diethylene glycol di(meth)acrylate, triethylene glycol di(meth)acrylate, tetraethylene glycol di(meth)acrylate, polyethylene glycol di(meth)acrylate, 1,6-hexane diol di(meth)acrylate, neopentyl glycol di(meth)acrylate, tripropylene glycol di(meth)acrylate, polypropylene glycol di(meth)acrylate, 2,2'-bis(4-((meth)acryloxydiethoxy)phenyl)propane, trimethylolpropane tri(meth)acrylate, tetramethylolpropane tetra(meth)acrylate, divinylbenzene, divinylnaphthalene and divinyl ether.

In addition, it is possible to further add well-known chain transfer agents and polymerization inhibitors in order to control the degree of polymerization.

Examples of polymerization initiators used for obtaining the styrene acrylic resin include organic peroxide-based initiators and azo-based polymerization initiators.

Examples of organic peroxide-based initiators include benzoyl peroxide, lauroyl peroxide, di-α-cumyl peroxide, 2,5-dimethyl-2,5-bis(benzoyl peroxy)hexane, bis(4-t-butylcyclohexyl) peroxydicarbonate, 1,1-bis(t-butyl peroxy)cyclododecane, t-butyl peroxymaleic acid, bis(t-butyl peroxy) isophthalate, methyl ethyl ketone peroxide, tert-butyl peroxy-2-ethylhexanoate, diisopropyl peroxycarbonate, cumene hydroperoxide, 2,4-dichlorobenzoyl peroxide and tert-butyl-peroxypivalate.

Examples of azo type initiators include 2,2'-azobis(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobis(methylbutyronitrile) and 2,2'-azobis-(methylisobutyrate).

In addition, a redox type initiator obtained by combining an oxidizing substance with a reducing substance can be used as a polymerization initiator.

Examples of oxidizing substances include inorganic peroxides such as hydrogen peroxide and persulfates (sodium salts, potassium salts and ammonium salts), and oxidizing metal salts such as tetravalent cerium salts.

Examples of reducing substances include reducing metal salts (divalent iron salts, monovalent copper salts and trivalent chromium salts), ammonia, amino compounds such as lower amines (amines having from 1 to 6 carbon atoms, such as methylamine and ethylamine) and hydroxylamine, reducing sodium compounds such as sodium thiosulfate, sodium hydrosulfite, sodium hydrogen sulfite, sodium sulfite and aldehyde sulfoxylates, lower alcohols (having from 1 to 6 carbon atoms), ascorbic acid and salts thereof, and lower aldehydes (having from 1 to 6 carbon atoms).

The polymerization initiator is selected with reference to 10-hour half-life decomposition temperatures, and can be a single polymerization initiator or a mixture thereof. The added quantity of polymerization initiator varies according to the target degree of polymerization, but is generally a quantity of from 0.5 parts by mass to 20.0 parts by mass relative to 100.0 parts by mass of polymerizable monomer.

Release Agent

A well-known wax can be used as a release agent in the toner.

Specific examples thereof include petroleum-based waxes and derivatives thereof, such as paraffin waxes, microcrystalline waxes and petrolatum, montan wax and derivatives thereof, hydrocarbon waxes and derivatives thereof obtained using the Fischer Tropsch process, polyolefin waxes and derivatives thereof, such as polyethylene waxes, and natural waxes and derivatives thereof, such as carnauba wax and candelilla wax, and derivatives include oxides, block copolymers with vinyl monomers, and graft-modified products.

Further examples include higher aliphatic alcohols; fatty acids, such as stearic acid and palmitic acid, and amides, esters and ketones of these acids; hydrogenated castor oil and derivatives thereof, plant waxes and animal waxes. It is possible to use one of these release agents in isolation, or a combination thereof.

Of these, use of a polyolefin, a hydrocarbon wax produced using the Fischer Tropsch process or a petroleum-based wax is preferred from the perspectives of developing performance and transferability being improved. Moreover, antioxidants may be added to these waxes as long as the advantageous effect of the toner is not impaired. In addition, from the perspectives of phase separation from the binder resin and crystallization temperature, preferred examples include higher fatty acid esters such as behenyl behenate and dibehenyl sebacate.

In addition, the content of the release agent is preferably from 1.0 parts by mass to 30.0 parts by mass relative to 100.0 parts by mass of the binder resin.

The melting point of the release agent is preferably from 30° C. to 120° C., and more preferably from 60° C. to 100° C. By using a release agent that exhibits thermal properties such as those mentioned above, a releasing effect is efficiently achieved and a broader fixing range is ensured.

Plasticizer

The toner particle may contain a crystalline plasticizer in order to improve sharp melt properties. The plasticizer is not particularly limited, and well-known plasticizers used in toners, such as those listed below, can be used.

Specific examples thereof include esters of monohydric alcohols and aliphatic carboxylic acids and esters of monohydric carboxylic acids and aliphatic alcohols, such as behenyl behenate, stearyl stearate and palmityl palmitate; esters of dihydric alcohols and aliphatic carboxylic acids and esters of dihydric carboxylic acids and aliphatic alcohols, such as ethylene glycol distearate, dibehenyl sebacate and hexane diol dibehenate; esters of trihydric alcohols and aliphatic carboxylic acids and esters of trihydric carboxylic acids and aliphatic alcohols, such as glycerin tribehenate; esters of tetrahydric alcohols and aliphatic carboxylic acids and esters of tetrahydric carboxylic acids and aliphatic alcohols, such as pentaerythritol tetrastearate and pentaerythritol tetrapalmitate; esters of hexahydric alcohols and aliphatic carboxylic acids and esters of hexahydric carboxylic acids and aliphatic alcohols, such as dipentaerythritol hexastearate and dipentaerythritol hexapalmitate; esters of polyhydric alcohols and aliphatic carboxylic acids and esters of polycarboxylic acids and aliphatic alcohols, such as polyglycerol behenate; and natural ester waxes such as carnauba wax and rice wax. It is possible to use one of these plasticizers in isolation, or a combination thereof.

Colorant

The toner particle may contain a colorant. A well-known pigment or dye can be used as the colorant. From the perspective of excellent weathering resistance, a pigment is preferred as the colorant.

Examples of cyan colorants include copper phthalocyanine compounds and derivatives thereof, anthraquinone compounds and basic dye lake compounds. Specific examples thereof include the following. C.I. Pigment Blue 1, 7, 15, 15:1, 15:2, 15:3, 15:4, 60, 62 and 66.

Examples of magenta colorants include condensed azo compounds, diketopyrrolopyrrole compounds, anthraquinone compounds, quinacridone compounds, basic dye lake compounds, naphthol compounds, benzimidazolone compounds, thioindigo compounds and perylene compounds.

Specific examples thereof include the following. C.I. Pigment Red 2, 3, 5, 6, 7, 23, 48:2, 48:3, 48:4, 57:1, 81:1, 122, 144, 146, 150, 166, 169, 177, 184, 185, 202, 206, 220, 221 and 254, and C.I. Pigment Violet 19.

Examples of yellow colorants include condensed azo compounds, isoindolinone compounds, anthraquinone compounds, azo metal complexes, methine compounds and allylamide compounds.

Specific examples thereof include the following. C.I. Pigment Yellow 12, 13, 14, 15, 17, 62, 74, 83, 93, 94, 95, 97, 109, 110, 111, 120, 127, 128, 129, 147, 151, 154, 155, 168, 174, 175, 176, 180, 181, 185, 191 and 194.

Examples of black colorants include carbon black and materials colored black using the yellow colorants, magenta colorants and cyan colorants mentioned above. It is possible to use one of these colorants in isolation, or a combination thereof, and these can be used in the form of solid solutions. The content of the colorant is preferably from 1.0 parts by mass to 20.0 parts by mass relative to 100.0 parts by mass of the binder resin.

Charge Control Agent and Charge Control Resin

The toner particle may contain a charge control agent or a charge control resin. A well-known charge control agent can be used, and a charge control agent which has a fast triboelectric charging speed and can stably maintain a certain triboelectric charge quantity is particularly preferred. Furthermore, in a case where a toner particle is produced using a suspension polymerization method, a charge control agent which exhibits low polymerization inhibition properties and which is substantially insoluble in an aqueous medium is particularly preferred.

Examples of charge control agents that impart the toner particle with negative chargeability include monoazo metal compounds, acetylacetone metal compounds, aromatic oxycarboxylic acid, aromatic dicarboxylic acid, oxycarboxylic acid and dicarboxylic acid-based metal compounds, aromatic oxycarboxylic acids, aromatic mono- and poly-carboxylic acids and metal salts, anhydrides and esters thereof, phenol derivatives such as bisphenol, urea derivatives, metal-containing salicylic acid-based compounds, metal-containing naphthoic acid-based compounds, boron compounds, quaternary ammonium salts, calixarenes and charge control resins.

It is possible to use a polymer or copolymer having a sulfonic acid group, a sulfonic acid salt group or a sulfonic acid ester group as the charge control resin. It is particularly preferable for a polymer having a sulfonic acid group, a sulfonic acid salt group or a sulfonic acid ester group to contain a sulfonic acid group-containing acrylamide-based monomer or a sulfonic acid group-containing methacrylamide-based monomer at a copolymerization ratio of 2 mass % or more, and more preferably 5 mass % or more.

The charge control resin preferably has a glass transition temperature (Tg) of from 35° C. to 90° C., a peak molecular weight (Mp) of from 10,000 to 30,000, and a weight average molecular weight (Mw) of from 25,000 to 50,000. In a case where this is used, it is possible to impart preferred triboelectric charging characteristics without adversely affecting thermal characteristics required of the toner particle. Furthermore, if the charge control resin contains a sulfonic acid group, dispersibility of the charge control resin per se in the polymerizable monomer composition and dispersibility of the colorant and the like are improved, and tinting strength, transparency and triboelectric charging characteristics can be further improved.

It is possible to add one of these charge control agents or charge control resins in isolation, or a combination of two or more types thereof. The added quantity of the charge control agent or charge control resin is preferably from 0.01 parts by mass to 20.0 parts by mass, and more preferably from 0.5 parts by mass to 10.0 parts by mass, relative to 100.0 parts by mass of the binder resin.

Toner Production Method

The method for producing the toner is not particularly limited, and a well-known method such as a pulverization method, a dissolution suspension method, an emulsion aggregation method or a dispersion polymerization method can be used. In any of these toner particle production methods, it is preferable to obtain a toner particle by adding a boric acid source when the raw materials are mixed. Here, the toner is preferably produced using the method described below. That is, the toner is preferably produced using an emulsion aggregation method.

The toner production method preferably includes steps (1) to (3) below (1) a dispersion step for preparing a dispersed solution of binder resin fine particles that contain the binder resin, (2) an aggregation step for aggregating binder resin fine particles contained in the dispersed solution of binder resin fine particles so as to form aggregates, and (3) a fusion step for heating and fusing the aggregates, and a boric acid source is added to a dispersed solution in at least one of the step (2) and step (3).

A case where the toner is produced using an emulsion aggregation method is preferred from the perspectives of ease in controlling the shape of the toner and the boric acid tending to be homogeneously dispersed near the toner particle surface.

Details of the emulsion aggregation method will now be described.

Emulsion Aggregation Method

An emulsion aggregation method is a method in which toner particles are produced by first preparing aqueous dispersed solutions of fine particles which comprise the constituent materials of the toner particles and which are substantially smaller than the desired particle diameter, and then aggregating these fine particles in an aqueous medium until the particle diameter of the toner particles is reached, and then carrying out heating or the like so as to fuse the resin.

That is, in an emulsion aggregation method, a toner is produced by carrying out a dispersion step for producing dispersed solutions comprising fine particles of constituent materials of the toner; an aggregation step for aggregating fine particles comprising the constituent materials of the toner so as to control the particle diameter until the particle diameter of the toner is reached; a fusion step for subjecting the resin contained in the obtained aggregated particles to melt adhesion; a sphere-forming step for carrying out further heating or the like so as to melt the resin and control the toner surface form; a cooling step thereafter; a metal removal step for filtering the obtained toner and removing excess polyvalent metal ions; a filtering/washing step for filtering the obtained toner and washing with ion exchanged water or the like; and a step for removing water from the washed toner and drying.

Step of Preparing Resin Fine Particle-Dispersed Solution (Dispersion Step)

The resin fine particle-dispersed solution can be prepared by known methods, but is not limited to these methods. Examples of known methods include, for example, an emulsion polymerization method, a self-emulsifying method, a phase inversion emulsification method in which a resin is emulsified by adding an aqueous medium to a resin solution obtained by dissolution in an organic solvent, or a forced emulsification method in which an organic solvent is not used and a resin is forcibly emulsified by high-temperature treatment in an aqueous medium.

Specifically, a binder resin is dissolved in an organic solvent capable of dissolving the resin, and a surfactant or a basic compound is added. At that time, where the binder resin is a crystalline resin having a melting point, the resin may be melted by heating above the melting point. Subsequently, the aqueous medium is slowly added while stirring with a homogenizer or the like to precipitate the resin fine particles. Then, the solvent is removed by heating or reducing the pressure to prepare an aqueous dispersion liquid of resin fine particles. As the organic solvent used to dissolve the resin, any organic solvent that can dissolve the resin can be used, but from the viewpoint of suppressing the generation of coarse powder, it is preferable to use an organic solvent that forms a uniform phase with water such as toluene.

The surfactant to be used at the time of emulsification is not particularly limited, and examples thereof include an anionic surfactant of a sulfuric acid ester salt type, a sulfonic acid salt type, a carboxylic acid salt type, a phosphoric acid ester type, a soap type, and the like; a cationic surfactant of an amine salt type, a quaternary ammonium salt type, and the like; a nonionic surfactant of a polyethylene glycol type, an alkylphenol ethylene oxide adduct type, a polyhydric alcohol type, and the like. The surfactants may be used alone or in combination of two or more.

Examples of the basic compound to be used in the dispersion step include an inorganic base such as sodium hydroxide, potassium hydroxide, and the like; and an organic base such as ammonia, triethylamine, trimethylamine, dimethylaminoethanol, diethylaminoethanol, and the like. The basic compounds may be used alone or in combination of two or more.

Further, the 50% particle diameter (D50) of the binding resin fine particles in the aqueous dispersion of the resin fine particles based on the volume distribution is preferably 0.05 μm to 1.0 μm, and more preferably 0.05 μm to 0.4 μm. By adjusting the 50% particle diameter (D50) based on the volume distribution to the above range, it becomes easy to obtain toner particles having a volume average particle diameter of 3 μm to 10 μm, which is appropriate for toner particles.

A dynamic light scattering type particle diameter distribution meter Nanotrack UPA-EX150 (manufactured by Nikkiso Co., Ltd.) is used to measure the 50% particle diameter (D50) based on the volume distribution.

Colorant Fine Particle-Dispersed Solution

The colorant fine particle-dispersed solution to be used as needed can be prepared by the known method described hereinbelow, but is not limited to this method. Thus, the colorant fine particle-dispersed solution can be prepared by mixing a colorant, an aqueous medium and a dispersant with a mixer such as a known stirrer, emulsifier, and disperser. As the dispersant used here, known substances such as a surfactant and a polymer dispersant can be used.

Both the surfactant and the polymer dispersant can be removed in the washing step described hereinbelow, but the surfactant is preferable from the viewpoint of washing efficiency.

Examples of the surfactant include an anionic surfactant of a sulfuric acid ester salt type, a sulfonic acid salt type, a carboxylic acid salt type, a phosphoric acid ester type, a soap type, and the like; a cationic surfactant of an amine salt type, a quaternary ammonium salt type, and the like; a nonionic surfactant of a polyethylene glycol type, an alkylphenol ethylene oxide adduct type, a polyhydric alcohol type, and the like.

Among these, nonionic surfactants and anionic surfactants are preferable. Further, a nonionic surfactant and an anionic surfactant may be used in combination. The surfactants may be used alone or in combination of two or more. The concentration of the surfactant in the aqueous medium is preferably 0.5% by mass to 5% by mass.

The amount of the colorant fine particles in the colorant fine particle-dispersed solution is not particularly limited, but is preferably 1% by mass to 30% by mass with respect to the total mass of the colorant fine particle-dispersed solution.

Further, as for the dispersed particle diameter of the colorant fine particles in the aqueous dispersion of the colorant, from the viewpoint of dispersibility of the colorant in the finally obtained toner, the 50% particle diameter (D50) based on the volume distribution is preferably 0.5 μm or less. For the same reason, it is preferable that the 90% particle diameter (D90) based on the volume distribution be 2 μm or less. The dispersed particle diameter of the colorant fine particles dispersed in the aqueous medium is measured by a dynamic light scattering type particle diameter distribution meter (Nanotrack UPA-EX150: manufactured by Nikkiso Co., Ltd.).

Examples of a mixer such as a known stirrer, emulsifier, and disperser to be used to disperse the colorant in an aqueous media include an ultrasonic homogenizer, a jet mills, a pressure homogenizer, a colloid mill, a ball mill, a sand mill, and a paint shaker. These may be used alone or in combination.

Release Agent (Aliphatic Hydrocarbon Compound) Fine Particle-Dispersed Solution

If necessary, a release agent fine particle-dispersed solution may be used. The release agent fine particle-dispersed solution can be prepared by the known method described below, but is not limited to this method.

The release agent fine particle-dispersed solution can be produced by adding release agent to an aqueous medium including a surfactant, heating above the melting point of the release agent, dispersing into a particulate form with a homogenizer having a strong shearing ability (for example, "CLEARMIX W MOTION" manufactured by M-Technique Co., Ltd. and a pressure discharge type disperser (for example, "GAULIN HOMOGENIZER" manufactured by Gaulin Co., Ltd.), and then cooling to a temperature below the melting point.

As for the dispersed particle diameter of the release agent fine particle-dispersed solution in the aqueous release agent-dispersed solution, the 50% particle diameter (D50) based on the volume distribution is preferably 0.03 μm to 1.0 μm, and more preferably 0.1 μm to 0.5 μm. Further, it is preferable that there are no coarse particles of 1 μm or more.

When the dispersed particle diameter of the release agent fine particle-dispersed solution is within the above range, the release agent can be present in the toner in a finely dispersed state, the exuding effect at the time of fixing is maximized, and good separability can be obtained. The dispersed particle diameter of the release agent fine particle-dispersed solution obtained by dispersing in the aqueous medium can be measured with a dynamic light scattering type particle diameter distribution meter (Nanotrack UPA-EX150: manufactured by Nikkiso).

Mixing Step

In the mixing step, a mixed liquid is prepared by mixing the resin fine particle-dispersed solution and, if necessary, at least one of the release agent fine particle-dispersed solution and the colorant fine particle-dispersed solution. It is possible to use a well-known mixing apparatus, such as a homogenizer or a mixer.

Step for Forming Aggregate Particles (Aggregation Step)

In the aggregation step, fine particles contained in the mixed solution prepared in the mixing step are aggregated so as to form aggregates having the target particle diameter. Here, by adding and mixing a flocculant and applying heat and/or a mechanical force as appropriate if necessary, aggregates are formed through aggregation of resin fine particles and, if necessary, release agent fine particles and/or colorant fine particles.

Examples of flocculants include organic flocculants, such as quaternary salt type cationic surfactants and polyethyleneimines; and inorganic flocculants, such as inorganic metal salts such as sodium sulfate, sodium nitrate, sodium chloride, calcium chloride and calcium nitrate; inorganic ammonium salts such as ammonium sulfate, ammonium chloride and ammonium nitrate; and divalent or higher metal complexes. In addition, an acid may be added in order to lower the pH and achieve soft aggregation, and sulfuric acid, nitric acid, or the like, can be used.

The flocculant may be added in the form of a dry powder or an aqueous solution dissolved in an aqueous medium, but adding the flocculant in the form of an aqueous solution is preferred in order to bring about uniform aggregation. In addition, it is preferable for the flocculant to be added and mixed at a temperature that is not higher than the glass transition temperature or melting point of the resin contained in the mixed solution. By mixing under these temperature conditions, aggregation progresses relatively uniformly. When mixing the flocculant in the mixed solution, it is possible to use a well-known mixing apparatus, such as a homogenizer or a mixer. The aggregation step is a step in which toner particle-sized aggregates are formed in the aqueous medium. The volume average particle diameter of aggregates produced in the aggregation step is preferably 3 to 10 μm. The volume average particle diameter can be measured using a particle size distribution analyzer that uses the Coulter principle (a Coulter Multisizer III: produced by Beckman Coulter, Inc.).

Step for Obtaining Dispersed Solution Containing Toner Particles (Fusion Step)

In the fusion step, aggregation is first stopped in the dispersed solution containing aggregates obtained in the aggregation step while agitating in the same way as in the aggregation step. The aggregation is stopped by adding an aggregation-stopping agent able to adjust the pH, such as a base, a chelate compound or an inorganic compound such as sodium chloride.

After the dispersed state of aggregated particles in the dispersed solution has stabilized as a result of the action of the aggregation-stopping agent, the aggregated particles are fused and a desired particle diameter is achieved by being heated to a temperature that is not lower than the glass transition temperature or melting point of the binder resin. Moreover, the 50% particle diameter on a volume basis (D50) of the toner particles is preferably 3 to 10 μm.

Cooling Step

If necessary, the temperature of the dispersed solution containing the toner particles obtained in the fusion step is lowered in the cooling step to a temperature that is lower than the crystallization temperature and/or glass transition temperature of the binder resin.

Post-Treatment Steps

In the toner production method, post-treatment steps such as a washing step, a solid-liquid separation step and a drying step may be carried out after the cooling step, and toner particles can be obtained in a dry state by carrying out these post-treatment steps.

External Addition Step

In the external addition step, toner particles obtained in the drying step are externally treated with an external additive that serves as the external additive A. In addition to the external additive A, the external additive B and other external additives may be added if necessary. Specific examples of other external additives include inorganic fine particles such as silica and resin fine particles of vinyl-based resins, polyester resins, silicone resins, and the like. It is preferable to add these external additives while, for example, applying a shearing force in a dried state.

The toner particle production method preferably has a shell formation step, which is carried out after obtaining toner particles (core particles) using any of the production methods described above and which comprises further adding resin fine particles containing a shell-forming resin to an aqueous dispersion in which the core particles are dispersed so as to cause the resin fine particles to adhere to the core particles and form a shell. A toner production method that uses an emulsion aggregation method preferably has a shell formation step, which is carried out after forming aggregated particles (core particles) in the aggregation step and which comprises further adding resin fine particles containing a shell-forming resin so as to cause the resin fine particles to adhere to the core particles and form a shell. That is, the toner particle preferably has a core particle that contains the binder resin and a shell on the surface of the core particle. The shell-forming resin may be the same as, or different from, a resin used as the binder resin. The added quantity of the shell-forming resin is preferably 1 to 10 parts by mass, and more preferably 2 to 7 parts by mass, relative to 100 parts by mass of the binder resin contained in the core particles.

In this case, the toner production method preferably has the following steps.

(1) a dispersion step for preparing a dispersed solution of binder resin fine particles that contain the binder resin, (2-1) an aggregation step for aggregating binder resin fine particles contained in the dispersed solution of binder resin fine particles so as to form aggregates, (2-2) a shell formation step for further adding resin fine particles containing a shell-forming resin to the dispersed solution containing the aggregates, causing the resin fine particles to adhere to the aggregates, and forming aggregates having a shell, and (3) a fusion step for heating and fusing the aggregates having a shell formed thereon.

In addition, in order for the boric acid to be easily incorporated near the toner particle surface, it is preferable to add a boric acid source together with the resin fine particles containing the shell-forming resin to the dispersed solution containing aggregates in step (2-2).

The boric acid source may be boric acid or a compound that can be converted into boric acid by, for example, controlling the pH during production of the toner. For example, it is possible to use at least one substance selected from the group consisting of boric acid, borax, organic boric acids, boric acid salts, boric acid esters, and the like. For example, it is possible to add a boric acid source and control so that boric acid is contained in the aggregates. It is preferable to attain acidic pH conditions in the aggregation step (2-1) and then carry out the shell formation step.

The boric acid may be present in an unsubstituted state in the aggregates. The boric acid source is preferably at least one substance selected from the group consisting of boric acid and borax. In a case where the toner is produced in an aqueous medium, it is preferable to add the boric acid as a boric acid salt from the perspectives of reactivity and production stability. Specifically, the boric acid source is more preferably at least one substance selected from the group consisting of sodium tetraborate, borax, ammonium borate, and the like, and is further preferably borax.

Because borax is sodium tetraborate ($Na_2B_4O_7$) decahydrate and is converted into boric acid in acidic aqueous solutions, it is preferable to use borax in a case where the boric acid is used in an acidic environment in an aqueous medium. The method of addition may comprise adding the borax in the form of a dry powder or an aqueous solution dissolved in an aqueous medium, but adding the borax in the form of an aqueous solution is preferred in order to bring about uniform aggregation. The concentration of the aqueous solution should be altered, as appropriate, according to the concentration to be contained in the toner, and is, for example, 1 to 20 mass %. In order to convert the borax into boric acid, it is preferable to attain acidic pH conditions before the addition, during the addition or after the addition. For example, the pH should be regulated to 1.5 to 5.0, and preferably 2.0 to 4.0. The pH is preferably regulated before the aggregation step for forming aggregates. That is, it is preferable to attain acidic pH conditions before the aggregation step in the mixing step in which the dispersed solution of binder resin fine particles and, if necessary, other dispersed solutions such as the release agent fine particle-dispersed solution are mixed.

Methods for measuring physical property values will now be described.

Methods for Measuring Particle Diameter and Shape Factor of External Additive A

The particle diameter of the external additive A is measured using a "S-4800" scanning electron microscope (available from Hitachi, Ltd.). A toner to which the external additive has been externally added is observed, and the particle diameter is determined by measuring the major diameter (length) of a primary particle of the external additive in a field of view at a maximum magnification rate of 200,000 times. The magnification rate is adjusted as appropriate according to the size of the external additive.

The shape factor SF-1 and SF-2 of the external additives are calculated in the manner described below by observing the toner, to which the external additive has been externally added, using an S-4800 scanning electron microscope (SEM) produced by Hitachi, Ltd.

The magnification rate is adjusted as appropriate according to the size of the external additive, but the external additive A is deemed to be an external additive having a primary particle major diameter of from 80 nm to 200 nm in a field of view at a maximum magnification rate of 200,000 times using "Image-Pro Plus 5.1J" image processing software (produced by Media Cybernetics). 100 external additive A (particles) are selected, and SF-1 and SF-2 are calculated from the major diameter, circumference and area of the particles in question. The shape factors SF-1 and SF-2 of individual particles are calculated using the formulae shown below, and the arithmetic mean values for 100 particles are taken to be the shape factors SF-1 and SF-2.

$$\text{SF-1}=(\text{major diameter of particle})^2/\text{area of particle}\times 100\times\pi/4$$

$$\text{SF-2}=(\text{circumference of particle})^2/\text{area of particle}\times 100/4\pi$$

Measurement of Content of External Additive A in Toner

The content of the external additive A is measured using a DC24000 disk centrifuging type particle size distribution measurement apparatus produced by CPS Instruments Inc. The measurement method is as follows. First, a dispersion medium is prepared by placing 0.5 mg of Triton-X100 (produced by Kishida Chemical Co., Ltd.) in 100 g of ion exchanged water. 0.6 g of toner is added to 9.4 g of this dispersion medium and dispersed for 5 minutes using an ultrasonic disperser. Next, a dedicated syringe needle for the measurement apparatus (produced by CPS) is attached to the tip of an all plastic disposable syringe (produced by Tokyo Garasu Kikai Co., Ltd.) to which is attached a syringe filter (diameter: 13 mm/pore diameter: 0.45 μm, produced by Advantec Toyo), and 0.1 mL of a supernatant liquid is collected. The supernatant liquid collected with the syringe is injected into the DC24000 disk centrifuging type particle size distribution measurement apparatus, and the content of the external additive A is measured.

Details of the measurement method are as follows. First, the disk is rotated at 24000 rpm by means of the Motor Control in the CPS software. The following conditions are then set from the Procedure Definitions.

(1) Sample Parameters

Maximum Diameter: 0.5 μm

Minimum Diameter: 0.05 μm

Particle Density: 1.5 to 2.2 g/mL (adjusted as appropriate according to sample)

Particle Refractive Index: 1.43

Particle Absorption: 0K

Non-Sphericity Factor: 1.1

(2) Calibration Standard Parameters

Peak Diameter: 0.226 μm

Half Height Peak Width: 0.1 μm

Particle Density: 1.389 g/mL

Fluid Density: 1.059 g/mL

Fluid Refractive Index: 1.369

Fluid Viscosity: 1.1 cps

After setting the conditions mentioned above, a density gradient solution is prepared from a 8 mass % aqueous solution of sucrose and a 24 mass % aqueous solution of sucrose using an AG300 autogradient maker produced by CPS Instruments Inc., and 15 mL of this density gradient solution is injected into a measurement vessel.

Following the injection, an oil film is formed by injecting 1.0 mL of dodecane (produced by Kishida Chemical Co., Ltd.) in order to prevent evaporation of the density gradient solution, and a waiting period of 30 minutes or more is then provided in order for the apparatus to stabilize.

Following the waiting period, 0.1 mL of calibration use standard particles (weight-based median particle diameter: 0.226 μm) is introduced into the measurement apparatus using a syringe, and calibration is carried out. The collected supernatant liquid is then injected into the apparatus and the content is measured. An example of data obtained from actual measurements is shown in the FIGURE. As shown in the FIGURE, the area of a peak obtained from 80 nm to 200 nm is taken to be the content of the external additive A.

In addition, a separately prepared calibration curve is obtained from peak areas obtained using the measurement method mentioned above by dispersing only the external additive A, and the content of external additive A in the toner is determined.

Identification and Quantification of Boric Acid Contained in Toner Particle

Identification and content measurement of boric acid contained in the toner particle are carried out using the following method.

Whether or not a toner particle contains boric acid can be confirmed using ATR-IR analysis, which is described later. Because a boric acid vibration is present at an absorption wavelength of 1380 $cm^{-1}$, it is possible to confirm the presence of boric acid.

In addition, it is possible to confirm whether or not boron derived from boric acid is present in an observed cross section by carrying out elemental analysis by means of energy dispersive X-Ray spectroscopy (EDX) using a transmission electron microscope (TEM).

When measuring the content of boric acid contained in the toner particle, measurements are carried out using fluorescence X-Ray measurements, and the content is determined using a calibration curve. Fluorescence X-Ray measurements of boron are carried out in accordance with JIS K 0119-1969, but are specifically carried out in the following way.

A wavelength-dispersive X-Ray fluorescence analysis apparatus (Axios produced by PANalytical) is used as the measurement apparatus, and dedicated software for this apparatus (SuperQ ver. 4.0F produced by PANalytical) is used in order to set measurement conditions and analyze measured data. Moreover, Rh is used as the X-Ray bulb anode, the measurement atmosphere is a vacuum, the measurement diameter (collimator mask diameter) is 27 mm, and the measurement time is 10 seconds. In addition, detection is carried out using a proportional counter (PC) when measuring boron, which is a light element.

4 g of toner particles was placed as a measurement sample in a dedicated aluminum ring for pressing, leveled off, pressurized for 60 seconds at a pressure of 20 MPa using a "BRE-32" tablet compression molder (produced by Maekawa Testing Machine MFG. Co., Ltd.), and molded into a pellet having a thickness of approximately 2 mm and a diameter of approximately 39 mm, and when PET is used as a spectral crystal, the count rate (units: cps) of B-Kα radiation observed at a diffraction angle (2θ) of 41.75° is measured.

In this case, the accelerating voltage of the X-Ray generator is 32 kV, and the current is 125 mA.

In addition, the amount (mass %) of boric acid in the toner particle is determined from a separately prepared boric acid calibration curve.

Measurements can be carried out using toner particles obtained by removing the external additives from the toner using the following method.

A concentrated sucrose solution is prepared by adding 160 g of sucrose (produced by Kishida Chemical Co., Ltd.) to 100 mL of ion exchanged water and dissolving the sucrose while immersing in hot water. 31 g of the concentrated sucrose solution and 6 mL of Contaminon N (a 10 mass % aqueous solution of a neutral detergent for cleaning precision measurement equipment, which has a pH of 7 and comprises a non-ionic surfactant, an anionic surfactant and an organic builder, produced by Wako Pure Chemical Industries, Ltd.) are placed in a centrifugal separation tube (capacity 50 mL). 1.0 g of toner is added to this and lumps of the toner are broken into smaller pieces using a spatula or the like. The centrifugal separation tube is shaken for 20 minutes at a rate of 300 spm (strokes per min) using a shaker (AS-1N produced by As One Corporation). Following the shaking, the solution is transferred to a (50 mL) swing rotor glass tube and subjected to separation for 30 minutes at 3500 rpm using a centrifugal separator (H-9R, produced by Kokusan Co., Ltd.).

Toner particles are separated from external additives in this procedure. It is confirmed by eye whether toner particles have been sufficiently separated from the aqueous solution, and toner particles separated into the uppermost layer are collected using a spatula or the like. A measurement sample is obtained by filtering the collected toner particles using a vacuum filtration device and then drying for 1 hour or longer using a dryer. This procedure is carried out multiple times in order to ensure the required amount.

IR Analysis by Means of ATR Method Using Germanium (Ge) in ATR Crystal

ATR-IR analysis of toner particles was carried out using the following method. Moreover, toner particles obtained by removing the external additives from the toner using the method described above can be used as a sample.

In IR analysis, measurements are carried out by means of an ATR method using a Spectrum One (Fourier transform infrared spectroscopy analyzer produced by PerkinElmer) equipped with a Universal ATR Sampling Accessory. The specific measurement procedure is as follows.

The incidence angle of infrared light (λ=5 μm) is set to 45°. A Ge ATR crystal (refractive index 4.0) is used as an ATR crystal. Other conditions are as follows.

Range

Start: 4000 $cm^{-1}$

End: 650 $cm^{-1}$ (Ge ATR crystal)

Duration

Scan number: 16

Resolution: 4.00 $cm^{-1}$

Advanced: $CO_2/H_2O$ correction carried out (1) A Ge ATR crystal (refractive index=4.0) is attached to an apparatus.

(2) Scan type is set to Background, Units are set to EGY, and background measurements are carried out.

(3) Scan type is set to Sample, and Units are set to A.

(4) 0.01 g of toner particles is precisely weighed out onto the ATR crystal.

(5) The sample is pressurized using a pressurizing arm. (Force Gauge: 90)

(6) The sample is measured.

It is confirmed whether or not an absorption peak is present at 1380 $cm^{-1}$ in the absorption spectrum. In a case where an absorption peak is detected at 1380 $cm^{-1}$, it is assessed that a peak corresponding to boric acid has been detected.

Dispersion Evaluation Index of External Additive B

The dispersion evaluation index of the external additive B at the toner surface is calculated using an "S-4800" scanning electron microscope. In a field of view having a magnification of 10,000 times, a toner to which the external additive B has been externally added was observed at an accelerating voltage of 1.0 kV using the same field of view. Calculations were carried out on the observed image in the following way using "Image-Pro Plus 5.1J" image editing software (produced by Media Cybernetics).

Only external additive B having primary particle lengths of from 5 nm to 30 nm are extracted and binarized, the number n of external additive B particles and barycentric coordinates for external additive B as a whole are calculated, and the distance do min of an external additive B particle to the nearest external additive B particle is calculated. The average value of the closest distance between external additive B particles in the image is denoted by d ave, and the degree of dispersion is represented by the formula below.

$$\text{Dispersion evaluation index} = \sqrt{\frac{\sum_{1}^{n}(dn\ \min - dave)^2}{2}} \Big/ dave$$

The degree of dispersion is calculated for 50 randomly observed toners using the procedure described above, and the average value thereof is taken to be the dispersion evaluation index. A smaller dispersion evaluation index means better dispersibility.

Method for Measuring Number Average Particle Diameter of External Additive B

The particle diameter of the external additive B is measured using a "S-4800" scanning electron microscope (produced by Hitachi, Ltd.). A toner to which the external additive has been externally added is observed, and the number average particle diameter is determined by measuring the major diameter of a primary particle of the external additive in a field of view at a maximum magnification rate of 200,000 times and extracting particle diameters of from 5 nm to 30 nm. The magnification rate is adjusted as appropriate according to the size of the external additive.

Measurement of Weight Average Particle Diameter (D4) and Number Average Particle Diameter (D1) of Toner and Toner Particle Using a Multisizer (registered trademark) 3 Coulter Counter precise particle size distribution analyzer (Beckman Coulter, Inc.) based on the pore electrical resistance method and equipped with a 100 μm aperture tube, together with the accessory dedicated Beckman Coulter Multisizer 3 Version 3.51 software (Beckman Coulter, Inc.) for setting measurement conditions and analyzing measurement data, measurement is performed with 25000 effective measurement channels, and the measurement data are analyzed to calculate the weight-average particle diameter (D4) and number average particle diameter (D1) of the toner particle or toner.

The aqueous electrolyte solution used in measurement may be a solution of special grade sodium chloride dissolved in ion-exchanged water to a concentration of about 1 mass %, such as ISOTON II (Beckman Coulter, Inc.) for example. The dedicated software settings are performed as follows prior to measurement and analysis.

On the "Standard measurement method (SOM) changes" screen of the dedicated software, the total count number in control mode is set to 50000 particles, the number of measurements to 1, and the Kd value to a value obtained with "standard particles 10.0 μm" (Beckman Coulter, Inc.). The threshold noise level is set automatically by pushing the "Threshold/Noise Level measurement button". The current is set to 1600 μA, the gain to 2, and the electrolyte solution to ISOTON II, and a check is entered for aperture tube flush after measurement. On the "Conversion settings from pulse to particle diameter" screen of the dedicated software, the bin interval is set to the logarithmic particle diameter, the particle diameter bins to 256, and the particle diameter range to from 2 μm to 60 μm. The specific measurement methods are as follows.

(1) About 200 mL of the aqueous electrolyte solution is added to a dedicated 250 mL round-bottomed beaker of the Multisizer 3, the beaker is set on the sample stand, and stirring is performed with a stirrer rod counter-clockwise at a rate of 24 rotations/second. Contamination and bubbles in the aperture tube are then removed by the "Aperture tube flush" function of the dedicated software.

(2) 30 mL of the same aqueous electrolyte solution is placed in a glass 100 mL flat-bottomed beaker, and about 0.3 mL of a dilution of "Contaminon N" (a 10 mass % aqueous solution of a pH 7 neutral detergent for washing precision instruments, comprising a nonionic surfactant, an anionic surfactant, and an organic builder, manufactured by Wako Pure Chemical Industries) diluted 3× by mass with ion-exchanged water is added.

(3) A specific amount of ion-exchanged water is placed in the water tank of an ultrasonic disperser (Ultrasonic Dispersion System Tetora 150, Nikkaki Bios) with an electrical output of 120 W equipped with two built-in oscillators having an oscillating frequency of 50 kHz with their phases shifted by 180° from each other, and about 2 mL of the Contaminon N is added to this water tank.

(4) The beaker of (2) above is set in the beaker-fixing hole of the ultrasonic disperser, and the ultrasonic disperser is operated. The height position of the beaker is adjusted so as to maximize the resonant condition of the liquid surface of the aqueous electrolyte solution in the beaker.

(5) The aqueous electrolyte solution in the beaker of (4) is exposed to ultrasound as about 10 mg of toner or toner particle is added bit by bit to the aqueous electrolyte solution, and dispersed. Ultrasound dispersion is then continued for a further 60 seconds. During ultrasound dispersion, the water temperature in the tank is adjusted appropriately to from 10° C. to 40° C.

(6) The aqueous electrolyte solution of (5) with the toner or toner particle dispersed therein is dripped with a pipette into the round-bottomed beaker of (1) set on the sample stand, and adjusted to a measurement concentration of about 5%. Measurement is then performed until the number of measured particles reaches 50000.

(7) The measurement data is analyzed with the dedicated software attached to the apparatus, and the weight-average particle diameter (D4) is calculated. The weight-average particle diameter (D4) is the "Average diameter" on the "Analysis/volume statistical value (arithmetic mean)" screen when Graph/vol % is set in the dedicated software, and the number-average particle diameter (D1) is the "Average diameter" on the "Analysis/Count statistical value (arithmetic mean)" screen when Graph/number % is set in the dedicated software.

Definition of External Additive A

When confirmed using the toner, whether or not the external additive A is organic-inorganic complex fine particles is defined by, for example, acquiring a compositional image using a scanning electron microscope and confirming that the external additive A is fine particles in which a difference in contrast occurs.

Method for Measuring Content of Inorganic Fine Particles in Organic-Inorganic Complex Fine Particles The content of inorganic fine particles in organic-inorganic complex fine particles is measured in the following way using a "Q5000IR" thermogravimetric analyzer (TGA) produced by TA Instruments.

0.03 g of organic-inorganic complex fine particles is placed as a sample in a dedicated Q5000IR pan, and the pan is placed in a measuring device. Here, the amount of sample is adjusted as appropriate in view of the bulkiness of the organic-inorganic complex fine particles. After reaching a state of equilibrium at normal pressure and 50° C., the sample is held in this state for 10 minutes, after which the sample mass (A) is measured. Next, nitrogen gas is supplied, the temperature is increased to 900° C. at a temperature increase rate of 20° C./min at normal pressure in a nitrogen atmosphere, and the sample mass (B) is then measured.

The content (mass %) of inorganic fine particles in organic-inorganic complex fine particles is the sample mass (B) after heating to 900° C. relative to the sample mass (A) after being held for 10 minutes at 50° C., and is determined using the following formula.

$$\text{Content (mass \%) of inorganic fine particles in organic-inorganic complex fine particles} = (B/A) \times 100$$

Separation of Organic-Inorganic Complex Fine Particles from Toner

Organic-inorganic complex fine particles are separated as the external additive A from the toner using the following method, and can be used in the measurements described above.

For example, the toner is ultrasonically dispersed in ion exchanged water so as to release the external additive A and other external additives, and allowed to rest for 24 hours. The supernatant liquid is separated and isolated using a centrifugal separation method, and then dried. In a case where the external additive A and other external additives are present, a target product can be isolated and obtained by means of further centrifugal separation that utilizes differences in particle diameter and specific gravity. Using the obtained external additive A, it is possible to measure the content of inorganic fine particles, the saturated moisture adsorption amount, and so on.

Method for Measuring Saturated Moisture Adsorption Amount

The saturated moisture adsorption amount of the external additive A is measured using a Q5000SA TGA (produced by TA Instruments). Measurements are carried out using the following procedure.

5 to 20 mg of the external additive A is weighed out into a sample pan, and the sample pan is placed in the TGA. Measurements are carried out under measurement conditions comprising 2 hours at a temperature of 32.5° C. and a relative humidity of 0%, then 2 hours at a temperature of 32.5° C. and a relative humidity of 80%, and then 2 hours at a temperature of 32.5° C. and a relative humidity of 0%. The difference between the amount of moisture after leaving the sample to stand for 2 hours from the start of measurements at a temperature of 32.5° C. and a relative humidity of 0% and the amount of moisture after leaving the sample to stand for 2 hours at a temperature of 32.5° C. and a relative humidity of 80% is taken to be the saturated moisture adsorption amount, and is calculated using the following formula.

Saturated moisture adsorption amount (mass %)=((the amount of moisture after leaving the sample to stand for 2 hours at a temperature of 32.5° C. and a relative humidity of 80%) minus (the amount of moisture after leaving the sample to stand for 2 hours at a temperature of 32.5° C. and a relative humidity of 0% for the first time))/mass of sample weighed out×100

In a case where the saturated moisture adsorption amount of the external additive A is measured using the toner to which external additive A has been externally added, measurements can be carried out after isolating the external additive A from the toner. For example, the toner is ultrasonically dispersed in ion exchanged water so as to release the external additive A and other external additives, and allowed to rest for 24 hours. It is possible to separate and isolate the supernatant liquid using a centrifugal separation method, carry out drying, and then measure the saturated moisture adsorption amount of the external additive A. In a case where the external additive A and other external additives are present, a target product can be isolated and obtained by means of further centrifugal separation that utilizes differences in particle diameter and specific gravity.

EXAMPLES

The present invention will now be explained in greater detail by means of the following production examples and working examples, but is in no way limited to these examples. Numbers of parts used in formulations in the working examples mean parts by mass unless explicitly indicated otherwise.

Production Examples of External Additives A1 to A5

External additives A1 to A5 are organic-inorganic complex particles, and can be produced in accordance with descriptions in working examples in WO 2013/063291. Using silica shown in Table 1, particles produced in accordance with Working Example 1 in WO 2013/063291 were prepared as organic-inorganic complex fine particles 1 used in the working examples described below.

Specifically, particles were produced using the following method.

A 15 nm colloidal silica dispersion, methacryloxypropyltrimethoxysilane and ion exchanged water were added to a 250 mL four neck round bottom flask equipped with a propeller type stirrer, a hot water bath and a temperature gauge, and stirred. The amount of colloidal silica was adjusted so that the content thereof was 67.0 mass % of the organic-inorganic complex fine particles.

The hot water bath was adjusted to a temperature of 65° C., and the contents of the flask were stirred for 30 minutes at 120 rpm in a nitrogen atmosphere. After 3 hours, a radical initiator (2,2'-azobisisobutyronitrile) dissolved in 10 mL of ethanol was added at a quantity of 1 mass % or less relative to MPS, the temperature was increased to 75° C., and polymerization was carried out for 5 hours.

Following completion of the polymerization, 3 mL (2.3 g; 0.014 moles) of 1,1,1,3,3,3-hexamethyldisilazane (HMDZ) was added to the mixture, and a treatment was carried out for 3 hours. The final mixture was filtered using a sieve to remove aggregated lumps, dried overnight at 120° C. in a tray, and then crushed to obtain external additive A1 as a target product.

Furthermore, external additives A2 to A5 were produced in the same way, except that the particle diameter and content of the inorganic fine particles, which were the silica used in the production, were changed as shown in Table 1. Physical properties of external additives A1 to A5, which are organic-inorganic complex fine particles, are shown in Table 1.

Production Example of External Additive A6

A flame was formed by supplying oxygen gas to a burner, lighting an ignition burner, and supplying hydrogen gas to the burner. Silicon tetrachloride was introduced to the burner as a raw material and gasified, a flame hydrolysis reaction was carried out for a preset residence time, and a generated silica powder was recovered. The obtained silica powder was then transferred to an electric oven and subjected to a heat treatment, thereby sintering and aggregating the silica powder. External additive A6, which was dry silica fine particles, was then obtained by adding 10 parts of hexamethyldisilazane as a surface treatment agent to 100 parts of the obtained silica fine particles so as to hydrophobically treat the silica fine particles. Physical properties are shown in Table 1.

Production Examples of External Additives A7 and A8

External additives A7 and A8 were obtained in the same way as external additive A6, except that the residence time in the flame and the heat treatment temperature of the silica powder were changed. Physical properties are shown in Table 1.

Production Example of External Additive A9

External additive A9 is an external additive in which the surface of silica fine particles, which were obtained using an ordinary sol-gel method in a wet process, were hydrophobically treated using hexamethyldisilazane.

Physical properties of the external additives A are as shown in Table 1.

TABLE 1

| External additive A No. | Type | Number average particle diameter (nm) of inorganic fine particles in organic-inorganic complex fine particles | Content (mass %) of inorganic fine particles | Number average particle diameter (nm) | Saturated moisture adsorption amount (mass %) |
|---|---|---|---|---|---|
| 1 | Organic-inorganic complex fine particles | 25 | 67.0 | 106 | 2.30 |
| 2 | Organic-inorganic complex fine particles | 15 | 48.0 | 90 | 3.90 |
| 3 | Organic-inorganic complex fine particles | 15 | 58.0 | 99 | 4.50 |
| 4 | Organic-inorganic complex fine particles | 25 | 58.0 | 113 | 2.00 |
| 5 | Organic-inorganic complex fine particles | 50 | 56.0 | 159 | 1.90 |
| 6 | Dry silica fine particles | — | — | 100 | 0.10 |
| 7 | Dry silica fine particles | — | — | 102 | 0.08 |
| 8 | Dry silica fine particles | — | — | 113 | 0.06 |
| 9 | Wet silica fine particles | — | — | 115 | 4.80 |

Production Example of External Additive B1

External additive B1 was silica in which a raw material obtained using a fumed method had BET specific surface area of 200 $m^2/g$ and which had a number average particle diameter of primary particles of 15 nm. The shape of this external additive was irregular.

Production Example of Toner Particle 1

Synthesis of Polyester Resin 1

- Adduct of 2 moles of ethylene oxide to bisphenol A: 9 parts by mole
- Adduct of 2 moles of propylene oxide to bisphenol A: 95 parts by mole
- Terephthalic acid: 50 parts by mole
- Fumaric acid: 30 parts by mole
- Dodecenylsuccinic acid: 25 parts by mole The monomers listed above were charged in a flask equipped with a stirrer, a nitrogen inlet tube, a temperature sensor and a rectifying column, the temperature was increased to 195° C. over a period of 1 hour, and it was confirmed that the contents of the reaction system had been uniformly stirred. Tin distearate was introduced at a quantity of 1.0 parts relative to 100 parts of the monomers. The temperature was increased from 195° C. to 250° C. over a period of 5 hours while distilling off water that had been generated, and a dehydrating condensation reaction was carried out for a further 2 hours at 250° C.

Obtained thereby was polyester resin 1, which had a glass transition temperature of 60.2° C., an acid value of 16.8 mg KOH/g, a hydroxyl value of 28.2 mg KOH/g, a weight average molecular weight of 11200 and a number average molecular weight of 4100.

Synthesis of Polyester Resin 2

Adduct of 2 moles of ethylene oxide to bisphenol A: 48 parts by mole
Adduct of 2 moles of propylene oxide to bisphenol A: 48 parts by mole
Terephthalic acid: 65 parts by mole
Dodecenylsuccinic acid: 30 parts by mole The monomers listed above were placed in a flask equipped with a stirrer, a nitrogen inlet tube, a temperature sensor and a rectifying column, the temperature was increased to 195° C. over a period of 1 hour, and it was confirmed that the contents of the reaction system had been uniformly stirred. Tin distearate was introduced at a quantity of 0.7 parts relative to 100 parts of the monomers. The temperature was increased from 195° C. to 240° C. over a period of 5 hours while distilling off water that had been generated, and a dehydrating condensation reaction was carried out for a further 2 hours at 240° C. The temperature was then lowered to 190° C., 5 parts by mole of trimellitic anhydride was added gradually, and a reaction was allowed to continue for 1 hour at 190° C.

Obtained thereby was polyester resin 2, which had a glass transition temperature of 55.2° C., an acid value of 14.3 mg KOH/g, a hydroxyl value of 24.1 mg KOH/g, a weight average molecular weight of 43600 and a number average molecular weight of 6200.

| Preparation of Resin Particle-Dispersed Solution 1 | |
|---|---|
| Polyester resin 1: | 100 parts |
| Methyl ethyl ketone: | 50 parts |
| Isopropyl alcohol: | 20 parts |

The methyl ethyl ketone and isopropyl alcohol were placed in a container. A polyester resin 1-dissolved solution was then obtained by gradually adding the resin and stirring so as to completely dissolve the resin. The temperature of the container holding this polyester resin 1-dissolved solution was set to 65° C., a total of 5 parts of a 10% aqueous solution of ammonia was gradually added dropwise while stirring, and 230 parts of ion exchanged water was then gradually added dropwise at a rate of 10 mL/min to effect phase inversion emulsification. A resin particle-dispersed solution 1 of polyester resin 1 was then obtained by removing the solvent under reduced pressure using an evaporator. The volume average particle diameter of these resin particles was 135 nm. In addition, the amount of resin particle solid content was adjusted to 20% using ion exchanged water.

| Preparation of Resin Particle-Dispersed Solution 2 | |
|---|---|
| Polyester resin 2: | 100 parts |
| Methyl ethyl ketone: | 50 parts |
| Isopropyl alcohol: | 20 parts |

The methyl ethyl ketone and isopropyl alcohol were placed in a container. A polyester resin 2-dissolved solution was then obtained by gradually adding the materials listed above and stirring so as to completely dissolve the materials. The temperature of the container holding this polyester resin 2-dissolved solution was set to 40° C., a total of 3.5 parts of a 10% aqueous solution of ammonia was gradually added dropwise while stirring, and 230 parts of ion exchanged water was then gradually added dropwise at a rate of 10 mL/min to effect phase inversion emulsification. A resin particle-dispersed solution 2 of polyester resin 2 was then obtained by removing the solvent under reduced pressure. The volume average particle diameter of these resin particles was 155 nm. In addition, the amount of resin particle solid content was adjusted to 20% using ion exchanged water.

| Preparation of Colorant Particle-Dispersed Solution | |
|---|---|
| Copper phthalocyanine (Pigment Blue 15:3): | 45 parts |
| Ionic surfactant (Neogen RK produced by Dai-ichi Kogyo Seiyaku Co., Ltd.): | 5 parts |
| Ion exchanged water: | 190 parts |

The components listed above were mixed, dispersed for 10 minutes using a homogenizer (an Ultratarax produced by IKA), and then subjected to a dispersion treatment for 20 minutes at a pressure of 250 MPa using an Ultimizer (a counter-impact wet grinding mill produced by Sugino Machine Limited) to obtain a colorant particle-dispersed solution which had a solids content of 20% and in which the volume average particle diameter of colored particles was 120 nm.

| Preparation of Release Agent Particle-Dispersed Solution | |
|---|---|
| Release agent (hydrocarbon wax; melting point 79° C.): | 15 parts |
| Ionic surfactant (Neogen RK produced by Dai-ichi Kogyo Seiyaku Co., Ltd.): | 2 parts |
| Ion exchanged water: | 240 parts |

The components listed above were heated to 100° C., thoroughly dispersed using an Ultratarax T50 produced by IKA, heated to 115° C. using a pressure discharge type Gaulin homogenizer, and subjected to a dispersion treatment for 1 hour to obtain a release agent particle-dispersed solution having a volume average particle diameter of 160 nm and a solids content of 20%.

| Production of toner Particle 1 | |
|---|---|
| Resin particle-dispersed solution 1: | 500 parts |
| Resin particle-dispersed solution 2: | 400 parts |
| Colorant particle-dispersed solution: | 50 parts |
| Release agent particle-dispersed solution: | 80 parts |

As a core formation step, the materials listed above were first placed in a round stainless steel flask and mixed. Next, the obtained mixed solution was dispersed for 10 minutes at 5000 rpm using a homogenizer (an Ultratarax T50 produced by IKA). A 1.0% aqueous solution of nitric acid was added to adjust the pH to 3.0, and the mixed solution was then heated to 58° C. in a heating water bath while appropriately adjusting the speed of rotation of a stirring blade so that the mixed solution was stirred. It was confirmed whether the volume average particle diameter of the formed aggregated particles was suitable using a Coulter Multisizer III, and when aggregated particles (cores) having a size of 5.0 μm had been formed, the materials listed below were introduced and stirred for 1 hour to form a shell as a shell formation step.

| | |
|---|---|
| Resin particle-dispersed solution 1: | 40 parts |
| Ion exchanged water: | 300 parts |
| 10.0 mass % aqueous solution of borax: | 19 parts |

(Borax: Sodium Tetraborate Decahydrate Produced by FUJIFILM Wako Pure Chemical Corporation)

The pH was then adjusted to 9.0 using a 5% aqueous solution of sodium hydroxide, and the solution was heated to 89° C. while continuing the stirring. When a desired surface form was obtained, the heating was stopped, the particles were cooled to 25° C., filtration and solid-liquid separation were carried out, and the particles were washed with ion exchanged water. Following completion of the washing, toner particles 1 having a weight-average particle diameter (D4) of 6.8 μm were obtained by drying with a vacuum dryer. Physical properties of obtained toner particle 1 are shown in Table 2.

Production Examples of Toner Particles 2 to 6 and 11

Toner particles 2 to 6 and 11 were obtained in the same way as toner particle 1, except that the formulation and conditions were changed to those shown in Table 1. Physical properties are shown in Table 2.

| Production Example of Toner Particle 7 | |
|---|---|
| Resin particle-dispersed solution 1: | 350.0 parts |
| Release agent particle-dispersed solution: | 50.0 parts |
| Colorant particle-dispersed solution: | 80.0 parts |
| Ion exchanged water: | 160.0 parts |

The materials listed above were placed in a round stainless steel flask and mixed. Next, the obtained mixed solution was dispersed for 10 minutes at 5000 rpm using a homogenizer (an Ultratarax T50 produced by IKA). A 1.0% aqueous solution of nitric acid was added to adjust the pH to 3.0, and the mixed solution was then heated to 58° C. in a heating water bath while appropriately adjusting the speed of rotation of a stirring blade so that the mixed solution was stirred. It was confirmed whether the volume average particle diameter of the formed aggregated particles was suitable using a Coulter Multi sizer III, and when aggregated particles having a volume average particle diameter of 4.0 μm were formed, 19.0 parts of a 10.0 mass % aqueous solution of borax was added. Following the addition of borax, 150.0 parts of resin particle-dispersed solution 1 was added, the volume average particle diameter of the aggregated particles was confirmed again, and when aggregated particles having a volume average particle diameter of 6.0 μm had been formed, the pH was adjusted to 9.0 using a 5% aqueous solution of sodium hydroxide. The solution was then heated to 75° C. while continuing the stirring. The aggregated particles were fused together by maintaining a temperature of 75° C. for 1 hour.

Crystallization of the polymer was then facilitated by cooling to 50° C. and maintaining this temperature for 3 hours.

The aggregated particles were then cooled to 25° C., filtered, subjected to solid-liquid separation, and then washed with ion exchanged water. Following completion of the washing, toner particles 7 were obtained by drying the filtered product using a vacuum dryer. Physical properties are shown in Table 2.

Production Example of Toner Particle 8

Toner particle 8 was obtained in the same way as in the production example of toner particle 1, except that the aqueous solution of borax was replaced with 12.0 parts of a 10.0 mass % aqueous solution of boric acid (boric acid; $H_3BO_3$ produced by FUJIFILM Wako Pure Chemical Corporation). Physical properties are shown in Table 2.

Production Example of Toner Particle 9

710 parts of ion exchanged water and 850 parts of a 0.1 mol/L aqueous solution of $Na_3PO_4$ were added to a four mouth container, and the container was held at a temperature of 60° C. while the contents of the vessel were stirred at a speed of 12,000 rpm using a T.K. Homomixer. 68 parts of a 1.0 mol/L aqueous solution of $CaCl_2$ was then added slowly to prepare an aqueous dispersion medium containing an ultrafine poorly water-soluble dispersion stabilizer ($Ca_3(PO_4)_2$).

| | |
|---|---|
| Styrene: | 76 parts |
| n-butyl acrylate: | 24 parts |
| C.I. Pigment Blue 15:3 (produced by Dainichiseika Color and Chemicals Mfg. Co., Ltd.): | 6.5 parts |
| Polyester resin (1): (Terephthalic acid-propylene oxide-modified bisphenol A (2 mole adduct) (molar ratio = 51:50), acid value = 10 mg KOH/g, glass transition temperature = 70° C., Mw = 10500, Mw/Mn = 3.20) | 5 parts |
| Negative charge control agent (aluminum 3,5-di-tert-butylsalicylate compound): | 0.4 parts |
| Fischer Tropsch wax (maximum endothermic peak temperature: 75° C.): | 7.5 parts |
| 10.0 mass % aqueous solution of borax: | 19.0 parts |

A monomer mixture was prepared by stirring the materials listed above for 3 hours using an attritor and dispersing the components in the polymerizable monomers. A polymerizable monomer composition was prepared by adding 10.0 parts (of a 50% toluene solution) of 1,1,3,3-tetramethylbutylperoxy-2-ethyl hexanoate, which is a polymerization initiator, to the monomer mixture. The polymerizable monomer composition was introduced into an aqueous dispersion medium, and granulation was carried out for 5 minutes while maintaining the rotational speed of the stirrer at 10,000 rpm. The high-speed stirrer was then replaced with a propeller type stirrer, the internal temperature was increased to 70° C., and a reaction was allowed to progress for 6 hours under gentle stirring.

Next, the temperature inside the vessel was increased to 80° C. and maintained for 4 hours, after which a slurry was obtained by cooling gradually to 30° C. at a cooling rate of 1° C./min. Dilute hydrochloric acid was added to the vessel containing the slurry, and the dispersion stabilizer was removed. Toner particle 9 was then obtained by filtering, washing and drying. Physical properties of toner particle 9 are as shown in Table 2.

| Production Example of Toner Particle 10 | |
|---|---|
| Polyester resin 1: | 60.0 parts |
| Polyester resin 2: | 40.0 parts |
| Copper phthalocyanine pigment (Pigment Blue 15:3): | 6.5 parts |
| Release agent (hydrocarbon wax; melting point 79° C.): | 5.0 parts |
| Plasticizer (ethylene glycol distearate): | 15.0 parts |
| Boric acid powder (produced by FUJIFILM Wako Pure Chemical Corporation): | 1.5 parts |

The materials listed above were pre-mixed using an FM mixer (produced by Nippon Coke & Engineering Co., Ltd.), and then melt kneaded using a twin screw kneading extruder (PCM-30 produced by Ikegai Corporation). The obtained kneaded product was cooled and coarsely pulverized using a hammer mill, 130 parts of ethyl acetate was added, and the product was heated to 80° C., stirred for 1 hour at a rotational speed of 5000 rpm using a T.K. Homomixer (produced by Tokushu Kika Kogyo Co., Ltd.), and then cooled to 30° C. to obtain a dissolved solution.

400 parts of water and 5 parts of Eleminol MON-7 (produced by Sanyo Chemical Industries, Ltd.) were placed in a separate container, the temperature was adjusted to 30° C., 100 parts of the dissolved solution mentioned above was added while stirring at a rotational speed of 13000 rpm using a T.K. Homomixer (produced by Tokushu Kika Kogyo Co., Ltd.), and stirring was continued for a further 20 minutes to obtain a slurry. Toner particle 10 was obtained by removing the solvent for 8 hours at 30° C. under reduced pressure while gently stirring the slurry, then carrying out an aging treatment for 4 hours at 45° C., and then washing, filtering and drying.

Physical properties of the obtained toner particle are shown in Table 2.

TABLE 2

| Toner particle No. | Toner production method | Number of parts of boric acid component added | | Content (mass %) of boric acid in toner particle | Fluorescence X-Ray Intensity (kcps) derived from boron | Weight average particle diameter (D4) μm |
|---|---|---|---|---|---|---|
| 1 | EA | 10.0 mass % Aqueous solution of borax | 19.0 | 1.0 | 0.15 | 6.1 |
| 2 | EA | 10.0 mass % Aqueous solution of borax | 57.0 | 3.0 | 0.25 | 6.2 |
| 3 | EA | 10.0mass % Aqueous solution of borax | 9.1 | 0.5 | 0.10 | 6.2 |
| 4 | EA | 10.0 mass % Aqueous solution of borax | 3.6 | 0.2 | 0.09 | 6.2 |
| 5 | EA | 40.0 mass % Aqueous solution of borax | 51.0 | 10.0 | 0.60 | 6.2 |
| 6 | EA | 40.0 mass % Aqueous solution of borax | 56.0 | 11.0 | 0.63 | 6.1 |
| 7 | EA | 10.0 mass % Aqueous solution of borax | 19.0 | 1.0 | 0.16 | 6.2 |
| 8 | EA | 10.0 mass % Aqueous solution of boric acid | 12.0 | 1.0 | 0.15 | 6.2 |
| 9 | SU | 10.0 mass % Aqueous solution of borax | 19.0 | 1.0 | 0.15 | 6.4 |
| 10 | P | Boric acid powder | 1.5 | 1.0 | 0.14 | 7.0 |
| 11 | EA | — | 0.0 | 0.0 | 0.00 | 6.3 |

In the table, EA indicates "Emulsion aggregation", SU indicates "Suspension method", and P indicates "Pulverization method". A peak corresponding to boric acid was observed when toner particles 1 to 10 were subjected to ATR-IR analysis using germanium. Said peak was not detected with toner particle 11.

Example 1

Toner particle 1 was subjected to external addition. Toner 1 was obtained by dry mixing 100.0 parts of toner particle 1, 1.2 parts of external additive A1 and 0.8 parts of external additive B1 for 7 minutes at a peripheral speed of 38 m/sec using a Henschel mixer (produced by Mitsui Mining Co., Ltd.). Physical properties of obtained toner 1 are shown in Table 3. The following real equipment evaluations were carried out using toner 1. The evaluation results are shown in Table 4.

Toner Evaluations

Toner evaluations were carried out using a modified version of a commercially available "LBP7600C" laser beam printer produced by Canon Inc. The printer was modified by altering the gears and software of the evaluation apparatus main body so that speed of rotation of a developing roller was set so as to rotate at twice the peripheral speed of the drum. In addition, a pre-exposure device was removed from the laser beam printer. By carrying out the modifications mentioned above, transfer of the external additives from the toner was facilitated and a harsher mode was used when evaluating changes in image density, scratches on an electrostatic latent image bearing member and level of contamination of a charging member.

Next, an electrophotographic device and a process cartridge were left to stand for 48 hours in an environment at a temperature of 23° C. and a relative humidity of 50% in order for these components to acclimatize to a measurement environment. After being left to stand, 20000 images having a print percentage of 4.0% were printed out in the transverse direction in the center of "letter" sized Business 4200 paper (produced by XEROX, 75 g/m$^2$), with 50 mm margins on the left and right of the paper, in the same normal temperature normal humidity environment (23° C./50% RH), and the initial image and the 20000th image were evaluated.

Evaluation of Charging Member Contamination

Charging member contamination (solid/half tone gradation stability) was evaluated in the following way. First, a drum unit for image checking and a drum unit for durability were prepared. The drum unit for durability was attached, and the 20000 images mentioned above were printed out. Next, a toner evaluation charging roller was attached to the drum unit for image checking, and an image was outputted. An image whose entire surface was printed at half tone (HT) was produced. In the half tone image, the density of a portion corresponding to the 50 mm margin on the left and right and the density of the center of the image, which was produced using an image after long term use, were measured, and charging member contamination was evaluated from the difference in density between the margin part and the center part.

Moreover, in a case where a charging member is contaminated, it is known that charge variations occur on an electrostatic latent image bearing member and that half tone image density variations occur. In addition, image density was measured using an X-Rite color reflection densitometer (500 Series produced by X-Rite). An evaluation of C or better was assessed as being good.

Evaluation Criteria

A: Half tone density difference after durability evaluation is less than 0.030

B: Half tone density difference after durability evaluation is not less than 0.030 but less than 0.050

C: Half tone density difference after durability evaluation is not less than 0.050 but less than 0.100

D: Half tone density difference after durability evaluation is not less than 0.100

Evaluation of Scratches on Electrostatic Latent Image Bearing Member

A half tone image having a toner laid-on level of 0.25 mg/cm$^2$ was outputted and evaluated using the following criteria. An evaluation of C or better was assessed as being good.

Evaluation Criteria

A: No longitudinal streaks are seen in the paper ejection direction on the image.

B: Several longitudinal streaks are seen in the paper ejection direction on the image. These are at a level that can be eliminated with image processing.

C: three or more longitudinal streaks are seen in the paper ejection direction on the image. These cannot be eliminated with image processing.

D: Longitudinal streaks are seen on at least half of the image. These cannot be eliminated with image processing.

Image Density Measurements

Image density measurements are carried out by measuring the relative density relative to a white background image having an image density of 0.00 using a "Macbeth RD918 reflection densitometer" (produced by Macbeth Corp.) in accordance with the user manual provided with the densitometer, and the obtained relative density was taken to be the image density value.

The initial image density and the density after long term printing were measured. Durable developing performance was assessed on the basis of the degree of decrease in image density from the initial image density to the density after long term printing. The initial image density and density after long-term printing were evaluated by outputting three completely solid images and taking the image density to be the average value of the density in the center of these three solid images. Evaluation criteria are as follows, and an evaluation of C or better was assessed as being good.

Initial Image Density

A: Image density is 1.45 or more.

B: Image density is from 1.40 to 1.44.

C: Image density is from 1.35 to 1.39.

D: Image density is 1.34 or less.

Evaluation of Durable Developing Performance

The difference between initial image density and density after long-term printing was evaluated using the following criteria.

A: Less than 0.05

B: Not less than 0.05 but less than 0.10

C: Not less than 0.10 but less than 0.20

D: Not less than 0.20

Examples 2 to 22 and Comparative Examples 1 to 4

Toners 2 to 26 were produced using toner particles 2 to 11 while altering the type and quantity of the external additive A and external addition conditions, and were evaluated in the same way as Working Example 1. Physical properties of toners 2 to 26 are shown in Table 3. Evaluation results for Working Examples 2 to 22 and Comparative Examples 1 to 4 are shown in Table 4.

TABLE 3

| Toner No. | Toner particle No. | External additive A No. | External additive formulation A Parts | External additive formulation B1 Parts | External addition conditions External addition intensity × time W × min | Shape factor of external additive A SF-1 | Shape factor of external additive A SF-2 | Dispersion evaluation index of external additive B |
|---|---|---|---|---|---|---|---|---|
| 1 | 1 | 1 | 1.2 | 0.8 | 38 m/sec × 7 min | 122 | 115 | 0.2 |
| 2 | 2 | 1 | 1.2 | 0.8 | 38 m/sec × 7 min | 122 | 115 | 0.2 |
| 3 | 3 | 1 | 1.2 | 0.8 | 38 m/sec × 7 min | 122 | 115 | 0.2 |
| 4 | 4 | 1 | 1.2 | 0.8 | 38 m/sec × 7 min | 122 | 115 | 0.2 |
| 5 | 5 | 1 | 1.2 | 0.8 | 38 m/sec × 7 min | 122 | 115 | 0.2 |
| 6 | 6 | 1 | 1.2 | 0.8 | 38 m/sec × 7 min | 122 | 115 | 0.2 |
| 7 | 1 | 1 | 1.2 | 0.8 | 38 m/sec × 2 min | 122 | 115 | 0.4 |
| 8 | 1 | 1 | 1.2 | 0.8 | 28 m/sec × 5 min | 122 | 115 | 0.5 |
| 9 | 4 | 1 | 1.2 | 0.8 | 28 m/sec × 5 min | 122 | 115 | 0.5 |
| 10 | 6 | 1 | 1.2 | 0.8 | 28 m/sec × 5 min | 122 | 115 | 0.5 |
| 11 | 1 | 2 | 1.2 | 0.8 | 38 m/sec × 7 min | 115 | 108 | 0.2 |
| 12 | 1 | 3 | 1.5 | 0.8 | 38 m/sec × 7 min | 105 | 102 | 0.2 |
| 13 | 1 | 4 | 1.2 | 0.8 | 38 m/sec × 7 min | 125 | 119 | 0.2 |
| 14 | 1 | 5 | 1.8 | 0.8 | 38 m/sec × 7 min | 135 | 120 | 0.2 |
| 15 | 1 | 3 | 1.8 | 0.8 | 38 m/sec × 2 min | 105 | 102 | 0.4 |
| 16 | 1 | 6 | 0.8 | 0.8 | 38 m/sec × 7 min | 150 | 130 | 0.2 |
| 17 | 1 | 7 | 0.8 | 0.8 | 38 m/sec × 7 min | 245 | 215 | 0.2 |
| 18 | 3 | 7 | 0.8 | 0.8 | 38 m/sec × 2 min | 245 | 215 | 0.4 |
| 19 | 7 | 1 | 0.8 | 0.8 | 38 m/sec × 7 min | 110 | 112 | 0.2 |
| 20 | 8 | 1 | 0.8 | 0.8 | 38 m/sec × 7 min | 110 | 112 | 0.2 |
| 21 | 9 | 1 | 1.0 | 0.6 | 38 m/sec × 7 min | 110 | 112 | 0.1 |
| 22 | 10 | 1 | 1.5 | 1.0 | 38 m/sec × 7 min | 110 | 112 | 0.6 |
| 23 | 11 | 4 | 1.0 | 0.8 | 38 m/sec × 5 min | 125 | 119 | 0.2 |
| 24 | 11 | 6 | 1.0 | 0.8 | 38 m/sec × 5 min | 150 | 130 | 0.2 |
| 25 | 2 | 8 | 0.8 | 0.8 | 38 m/sec × 5 min | 251 | 220 | 0.2 |
| 26 | 2 | 9 | 0.8 | 0.8 | 28 m/sec × 5 min | 100 | 101 | 0.5 |

Numbers in brackets in the evaluation results for streaks caused by scratches on an electrostatic latent image bearing member indicate the number of streaks.

TABLE 4

| Example | | | Evaluation of contamination of charging member HT image density difference | Evaluation of scratches on drum Streaks | Initial image density | Difference in image density after long term printing |
|---|---|---|---|---|---|---|
| Example | 1 | Toner 1 | 0.021 | A | 1.50 | 0.02 |
| | 2 | Toner 2 | 0.025 | A | 1.46 | 0.04 |
| | 3 | Toner 3 | 0.020 | B (1) | 1.50 | 0.01 |
| | 4 | Toner 4 | 0.018 | B (2) | 1.51 | 0.01 |
| | 5 | Toner 5 | 0.031 | A | 1.43 | 0.05 |
| | 6 | Toner 6 | 0.035 | A | 1.40 | 0.12 |
| | 7 | Toner 7 | 0.022 | B (1) | 1.46 | 0.05 |
| | 8 | Toner 8 | 0.023 | B (2) | 1.44 | 0.09 |
| | 9 | Toner 9 | 0.019 | C(3) | 1.50 | 0.01 |
| | 10 | Toner 10 | 0.037 | A | 1.38 | 0.18 |
| | 11 | Toner 11 | 0.029 | A | 1.44 | 0.04 |
| | 12 | Toner 12 | 0.060 | A | 1.40 | 0.04 |
| | 13 | Toner 13 | 0.019 | A | 1.41 | 0.04 |
| | 14 | Toner 14 | 0.018 | B (1) | 1.40 | 0.04 |
| | 15 | Toner 15 | 0.090 | B (1) | 1.38 | 0.18 |
| | 16 | Toner 16 | 0.017 | B (1) | 1.45 | 0.05 |
| | 17 | Toner 17 | 0.014 | C(3) | 1.40 | 0.08 |
| | 18 | Toner 18 | 0.013 | C(5) | 1.35 | 0.18 |
| | 19 | Toner 19 | 0.025 | A | 1.43 | 0.04 |
| | 20 | Toner 20 | 0.025 | B (1) | 1.46 | 0.04 |
| | 21 | Toner 21 | 0.048 | B (2) | 1.46 | 0.04 |
| | 22 | Toner 22 | 0.018 | C(5) | 1.35 | 0.19 |

TABLE 4-continued

| Example | | | Evaluation of contamination of charging member HT image density difference | Evaluation of scratches on drum Streaks | Initial image density | Difference in image density after long term printing |
|---|---|---|---|---|---|---|
| Comparative Example | 1 | Toner 23 | 0.028 | D (10) | 1.46 | 0.04 |
| | 2 | Toner 24 | 0.026 | D (15) | 1.41 | 0.08 |
| | 3 | Toner 25 | 0.031 | B (2) | 1.33 | 0.15 |
| | 4 | Toner 26 | 0.130 | A | 1.44 | 0.16 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-123737, filed Jul. 28, 2021, which is hereby incorporated by reference herein in its entirety.

What is claimed is:

1. A method for producing a toner comprising a toner particle and an external additive A on a surface of the toner particle;

the toner particle comprising a binder resin and boric acid;

the external additive A having a primary particle major diameter of 80 to 200 nm; and the toner particle having a core particle containing the binder resin, and a shell on a surface of the core particle, the method comprising the steps of:

(1) a dispersion step for preparing a dispersed solution of binder resin fine particles containing the binder resin;

(2-1) an aggregation step for the aggregating binder resin fine particles contained in the dispersed solution of the binder resin fine particles so as to form aggregates;

(2-2) a shell formation step for further adding shell-forming resin fine particles together with a source of the boric acid to the dispersed solution containing the aggregates, causing the resin fine particles to adhere to the aggregates, and forming aggregates having a shell, the shell-forming resin fine particles containing a shell-forming resin; and adding the external additive on the surface of the toner particle, wherein a peak corresponding to boric acid is detected in ATR-IR analysis of the toner particle in an ATR method using germanium as an ATR crystal, an intensity of boron derived from the boric acid in the toner particle in fluorescence X-Ray measurements of the toner particle is 0.10 to 0.60 kcps, the average value of a shape factor SF-1 of the external additive A is 105 to 250, and the average value of a shape factor SF-2 of the external additive A is 102 to 250.

2. The toner production method according to claim 1, wherein the toner comprises an external additive B different from the external additive A, external additive B is a silica fine particle, and external additive B has a number average particle diameter of 5 to 30 nm.

3. The toner production method according to claim 2, wherein external additive B has a dispersion evaluation index of 0.4 or less.

4. The toner production method according to claim 2, wherein the content of external additive B in the toner is 50 to 150 parts by mass relative to 100 parts by mass of external additive A in the toner.

5. The toner production method according to claim 1, wherein the shape factor SF-1 of the external additive A is 105 to 150, and the shape factor SF-2 of the external additive A is 102 to 140.

6. The toner production method according to claim 1, wherein the content of boric acid in the toner particle is 0.1 to 10.0 mass %.

7. The toner production method according to claim 1, wherein the content of the external additive A in the toner is 0.4 to 2.5 parts by mass relative to 100.0 parts by mass of the toner particle in the toner.

8. The toner production method according to claim 1, wherein the external additive A comprises an organic-inorganic complex fine particle in which inorganic fine particles are complexed with resin particles.

9. The toner production method according to claim 1, wherein external additive A has a saturated moisture adsorption amount of 0.10 to 4.50 mass %.

* * * * *